United States Patent
Huang et al.

(10) Patent No.: US 11,847,949 B2
(45) Date of Patent: Dec. 19, 2023

(54) ALWAYS ON DISPLAY CONTROL METHOD AND TERMINAL DEVICE

(71) Applicant: Huawei Technologies Co., Ltd., Shenzhen (CN)

(72) Inventors: Liwei Huang, Shenzhen (CN); Misu Jung, Shanghai (CN); Yan Wang, Nanjing (CN); Zhiyan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 17/600,283

(22) PCT Filed: Apr. 1, 2020

(86) PCT No.: PCT/CN2020/082794
§ 371 (c)(1),
(2) Date: Sep. 30, 2021

(87) PCT Pub. No.: WO2020/207314
PCT Pub. Date: Oct. 15, 2020

(65) Prior Publication Data
US 2022/0208064 A1    Jun. 30, 2022

(30) Foreign Application Priority Data
Apr. 10, 2019   (CN) .......................... 201910285707.4

(51) Int. Cl.
*G09G 3/20*    (2006.01)
*G09G 5/02*    (2006.01)
(Continued)

(52) U.S. Cl.
CPC ............ *G09G 3/2003* (2013.01); *G01W 1/02* (2013.01); *G09G 2320/0626* (2013.01)

(58) Field of Classification Search
CPC .. G09G 3/2003; G09G 3/2018; G09G 3/2803; G09G 3/3607; G09G 5/00;
(Continued)

(56) References Cited

U.S. PATENT DOCUMENTS

2009/0013241 A1*  1/2009  Kaminaga ............. G06F 16/447
                                              707/999.005
2014/0118272 A1   5/2014  Gunn
(Continued)

FOREIGN PATENT DOCUMENTS

CN           1105129 A       7/1995
CN         102202134 A       9/2011
(Continued)

OTHER PUBLICATIONS

Marc Rautenhaus et al., Transactions on Visualization and Computer Graphics, Dec. 1, 2018, IEEE (vol. 24, Issue: 12, pp. 3268-3296 (Year: 2018).*

*Primary Examiner* — Wesner Sajous
(74) *Attorney, Agent, or Firm* — Conley Rose, P.C.

(57) ABSTRACT

A method includes obtaining time information of a target area, determining a first color of a digital clock based on the time information, where the digital clock displays a time in a screen-off state, and displaying the digital clock on a display screen of a terminal device when the terminal device is in the screen-off state, where the first color is a second color when the time displayed by the digital clock is a first moment, where the first moment is in a first time interval, where the first color is a third color when the time displayed by the digital clock is a second moment, where the second moment is in a second time interval, where the first time interval is different from the second time interval, and where the second color and the third color are different colors.

20 Claims, 23 Drawing Sheets

(51) Int. Cl.
*G09G 5/00* (2006.01)
*G09G 5/30* (2006.01)
*H04N 5/57* (2006.01)
*G01W 1/02* (2006.01)

(58) Field of Classification Search
CPC .......... G09G 5/02; G09G 5/003; G09G 5/006; G09G 1/167; G09G 5/227; G09G 5/30; G09G 5/377; G09G 5/391; G09G 2290/00; G09G 2230/00; G09G 2320/00; G09G 2360/08; G09G 2320/02; G09G 2320/0233; G09G 2320/0238; G09G 2320/0242; G09G 2320/04; G09G 2320/06; G09G 2320/0626; G09G 2320/064; G09G 2320/0666; G09G 2320/08; G09G 2330/021; H04N 1/60; H04N 5/445; H04N 5/45; H04N 5/57; H04N 9/64; H04N 9/73; H04N 13/183; H04N 13/15; G06T 11/001; G01W 1/02; G06F 1/3287; G06F 1/3293; G06F 1/3296
USPC .......................................................... 345/589
See application file for complete search history.

(56) References Cited

U.S. PATENT DOCUMENTS

| | | | |
|---|---|---|---|
| 2016/0041597 | A1 | 2/2016 | Graham et al. |
| 2016/0048283 | A1* | 2/2016 | Yang ........................ G06F 3/016 715/784 |
| 2017/0047019 | A1 | 2/2017 | Li et al. |
| 2018/0121060 | A1* | 5/2018 | Jeong ..................... G06F 3/0488 |
| 2018/0233089 | A1 | 8/2018 | Okamoto |
| 2018/0268777 | A1 | 9/2018 | Kim et al. |
| 2019/0011948 | A1 | 1/2019 | Li |
| 2019/0050045 | A1 | 2/2019 | Jha et al. |
| 2019/0058834 | A1* | 2/2019 | Kim ...................... H04N 23/611 |
| 2020/0089302 | A1* | 3/2020 | Kim ...................... G06F 1/3265 |

FOREIGN PATENT DOCUMENTS

| | | |
|---|---|---|
| CN | 102810043 A | 12/2012 |
| CN | 103309578 A | 9/2013 |
| CN | 103347247 A | 10/2013 |
| CN | 103581315 A | 2/2014 |
| CN | 106774789 A | 5/2017 |
| CN | 107621918 A | 1/2018 |
| CN | 107688382 A | 2/2018 |
| CN | 107918534 A | 4/2018 |
| CN | 108494974 A | 9/2018 |
| CN | 108632444 A | 10/2018 |
| CN | 109343759 A | 2/2019 |
| CN | 109407924 A | 3/2019 |
| CN | 110149442 A | 8/2019 |
| EP | 2985736 A2 | 2/2016 |
| FR | 2863370 A1 | 6/2005 |
| JP | 2006198034 A | 8/2006 |
| JP | 2008160295 A | 7/2008 |
| JP | 2016536712 A | 11/2016 |
| JP | 2017532611 A | 11/2017 |
| JP | 2018159912 A | 10/2018 |
| KR | 20110103089 A | 9/2011 |
| WO | 2018196430 A1 | 11/2018 |

* cited by examiner

Sunny

Ambient light changes from dark to bright, and a corresponding target background pattern also becomes brighter

ALWAYS ON DISPLAY CONTROL METHOD AND TERMINAL DEVICE

CROSS-REFERENCE TO RELATED APPLICATIONS

This is a U.S. National Stage of International Patent Application No. PCT/CN2020/082794 filed on Apr. 1, 2020, which claims priority to Chinese Patent Application No. 201910285707.4 filed on Apr. 10, 2019, both of which are hereby incorporated by reference in their entireties.

TECHNICAL FIELD

This application relates to the communications field, and in particular, to an always on display control method and a terminal device.

BACKGROUND

With rapid development of electronic technologies, terminal devices such as a smartphone and a tablet computer have become indispensable tools in people's lives and work. A mobile phone is used as an example. According to statistics, people view the mobile phone 150 times a day. However, most users turn on a screen of the mobile phone only to view information such as time and a notification. Based on this, an always on display (always on display, AOD) function of the terminal device emerges. To be specific, only some pixels of the screen are lit up to display information such as time, a date, and a notification, and other pixels of the screen are always turned off (for example, in black), so that the user can conveniently view the foregoing information without lighting up the entire screen of the terminal device.

Currently, a display form of the always on display function of the terminal device is relatively simple. After a user enables the always on display function on the terminal device, the foregoing information displayed by the terminal device in an always on display state is only a single color (for example, white). This color is displayed all the time and cannot be changed, and this is very monotonous.

SUMMARY

According to a first aspect of the embodiments of this application, an always on display control method is provided, and specifically includes:

First, a terminal device obtains meteorological information of a target area in a current periodicity. Then, the terminal device determines corresponding to-be-displayed information based on the obtained meteorological information, and further determines a display attribute of a target object based on the to-be-displayed information. The to-be-displayed information may be in a plurality of representation forms such as text, code, or a pattern, and is mainly used to reflect the meteorological information, and this is not specifically limited herein. The display attribute of the target object includes a color and/or brightness, and the target object includes information displayed on the display by the terminal device in an always on display state. Finally, the terminal device displays, on a display in the always on display state, the target object whose display attribute is determined. It should be noted that the current periodicity described in this embodiment of this application is a periodicity for updating the meteorological information. It should be further noted that the terminal device described in this embodiment of this application is a terminal device having a display, and may be an intelligent terminal such as a mobile phone, a tablet computer, or a smart watch. The terminal device is not specifically limited herein.

In the foregoing implementation of this application, the terminal device associates the meteorological information of the target area in the current periodicity with the display attribute (including the color and/or the brightness) of the target object by using the to-be-displayed information. Information displayed by the terminal device in the always on display state is no longer displayed in a single color all the time, but different display attributes may be presented based on different meteorological information in different periodicities, to present different visual effects.

With reference to the first aspect of the embodiments of this application, in a first implementation of the first aspect of the embodiments of this application, the to-be-displayed information includes N background patterns, where N is a positive integer. That the terminal device determines corresponding to-be-displayed information based on the meteorological information, and determines a display attribute of a target object based on the to-be-displayed information may include:

The terminal device determines a corresponding target background pattern based on the meteorological information, where the target background pattern is one of the N background patterns. Then, the terminal device further determines a display attribute (for example, a color and/or brightness) of the target background pattern, and determines the display attribute of the target object based on the display attribute of the target background pattern. It should be noted that the background pattern in this embodiment of this application may be randomly selected, or may be selected according to a preset rule. This is not specifically limited herein. In addition, the color of the background pattern may be a plurality of colors, may be a single color, or may be a gradient color. This is not specifically limited herein.

In the foregoing implementation of this application, how the terminal device determines the display attribute of the target object based on the N background patterns and determines the display attribute of the target object based on the display attribute of the background pattern when the to-be-displayed information is the N background patterns is described. This is easier to implement and more intuitive.

With reference to the first aspect of the embodiments of this application and the first implementation of the first aspect of the embodiments of this application, in a second implementation of the first aspect of the embodiments of this application, when the meteorological information includes a sunrise moment and a sunset moment, the to-be-displayed information may be used to reflect a change of a position of the sun in the sky in a time interval from the sunrise moment to the sunset moment. Because the sun is in different positions at different time points after the sunrise in a day (that is, the solar altitude changes with time), the sky presents different colors. Based on this, the display attribute of the target object corresponding to the to-be-displayed information may include a gradient color and/or gradient brightness, which is used to simulate a change in a color and/or brightness of the sky caused by a change of solar altitudes at different time points in a day.

In the foregoing implementation of this application, the meteorological information is specifically the sunrise moment and the sunset moment, and the display attribute of the target object is specified, and is more pertinent.

With reference to the first aspect of the embodiments of this application and the first implementation of the first aspect of the embodiments of this application, in a third implementation of the first aspect of the embodiments of this application, when the meteorological information includes a weather condition (for example, sunny, cloudy, and dusty), the display attribute of the target object may include a single color (for example, blue on a sunny day, khaki on a dusty day, and gray on a cloudy day) and/or gradient brightness (for example, 100% brightness on a sunny day, 70% brightness on a dusty day, and 40% brightness on a cloudy day).

In the foregoing implementation of this application, the meteorological information may be further specifically a weather condition, and the display attribute of the corresponding target object is specified, and there are a plurality of options.

With reference to the first aspect of the embodiments of this application and the first implementation of the first aspect of the embodiments of this application, in a fourth implementation of the first aspect of the embodiments of this application, when the meteorological information includes a post-sunset moment, a polar night, or a polar day, the display attribute of the target object may include a specified color (for example, a specified color of the post-sunset moment is gray, a specified color of the polar night is black, and a specified color of the polar day is red) and/or specified brightness (for example, specified brightness of the post-sunset moment is 15%, specified brightness of the polar night is 5%, and specified brightness of the polar day is 100%).

In the foregoing implementation of this application, how the terminal device determines the display attribute of the target object when other meteorological information (for example, the post-sunset moment) or extreme meteorological information (for example, the polar night or the polar day) occurs is described. This is more comprehensive.

With reference to the first aspect of the embodiments of this application and the fourth implementation of the first aspect of the embodiments of this application, in a fifth implementation of the first aspect of the embodiments of this application, the specified color may be a specified single color or a specified gradient color. This implementation of this application provides more options for the specified color, and this is flexible.

With reference to the second implementation of the first aspect of the embodiments of this application, in a sixth implementation of the first aspect of the embodiments of this application, when the meteorological information includes the sunrise moment and the sunset moment, that the terminal device determines a corresponding target background pattern based on the meteorological information may include: The terminal device determines duration X between the sunrise moment and the sunset moment, in addition, may further determine a time interval P between the sunrise moment and the sunset moment, and then may determine a quantity N of all background patterns. Further, the terminal device may determine interval duration Y (where Y=X/N) based on the duration X and the quantity N, and may obtain N time intervals Q by equally dividing the time interval P according to the interval duration Y. Finally, the terminal device may determine, according to a preset rule, a target background pattern corresponding to each time interval.

In the foregoing implementation of this application, how the terminal device determines the corresponding target background pattern based on the meteorological information when the meteorological information is the sunrise moment and the sunset moment, and the to-be-displayed information is a background pattern is described. The determining method is simple and easy to implement.

With reference to the third implementation of the first aspect of the embodiments of this application, in a seventh implementation of the first aspect of the embodiments of this application, when the meteorological information includes the weather condition, that the terminal device determines a corresponding target background pattern based on the meteorological information may include: The terminal device determines, based on a mapping relationship, a target background pattern corresponding to the weather condition.

In the foregoing implementation of this application, how the terminal device determines the corresponding target background pattern based on the meteorological information when the meteorological information is the weather condition, and the to-be-displayed information is a background pattern is described. The determining method is direct and simple.

With reference to the first aspect of the embodiments of this application, the first implementation of the first aspect of the embodiments of this application to the seventh implementation of the first aspect of the embodiments of this application, in an eighth implementation of the first aspect of the embodiments of this application, that the terminal device determines a display attribute of the target background pattern may include: First, the terminal device obtains ambient light brightness of an environment in which the terminal device is located, and further determines brightness of the target background pattern based on the ambient light brightness.

In the foregoing implementation of this application, how the terminal device determines the brightness of the target background pattern is described, and the terminal device determines the brightness in real time.

With reference to the first implementation of the first aspect of the embodiments of this application to the eighth implementation of the first aspect of the embodiments of this application, in a ninth implementation of the first aspect of the embodiments of this application, the N background patterns may be obtained by the terminal device from a network in real time in the current periodicity; or the N background patterns may be built in the terminal device in advance.

In the foregoing implementation of this application, a plurality of background pattern obtaining manners are described, and more options are provided.

With reference to the first aspect of the embodiments of this application, the first implementation of the first aspect of the embodiments of this application to the ninth implementation of the first aspect of the embodiments of this application, in a tenth implementation of the first aspect of the embodiments of this application, the terminal device may obtain the meteorological information of the target area in the current periodicity by using a related application (for example, a weather application) installed on the terminal device, or may obtain the meteorological information of the target area in the current periodicity by using a related sensor apparatus built in the terminal device. This is not specifically limited herein. It should be noted that the target area may be an area in which the terminal device is located, or may be an area already set by a user on the terminal device.

In the foregoing implementation of this application, a plurality of manners in which the terminal device may obtain the meteorological information of the target area in the current periodicity are described, and more options are provided.

According to a second aspect of the embodiments of this application, a terminal device having a display is provided, and the terminal device has a function of implementing the method according to any one of the first aspect or the possible implementations of the first aspect. The function may be implemented by hardware, or may be implemented by hardware executing corresponding software. The hardware or the software includes one or more modules corresponding to the functions.

According to a third aspect of the embodiments of this application, a terminal device is further provided, and may include a display, a memory, a transceiver, a processor, and a bus system. The memory, the transceiver, and the processor are connected through the bus system. The display is configured to display a target object. The memory is configured to store a program and instructions. The transceiver is configured to receive or send information under control of the processor. The processor is configured to invoke the instructions stored in the memory to perform the control method in any one of the first aspect of the embodiments of this application and the implementations of the first aspect.

According to a fourth aspect of the embodiments of this application, a computer-readable storage medium is provided. The computer-readable storage medium stores instructions. When the instructions are run on a computer, the computer is enabled to perform the control method according to any one of the first aspect and the possible implementations of the first aspect.

According to a fifth aspect of the embodiments of this application, a computer program product including instructions is provided. When the computer program product is run on a computer, the computer is enabled to perform the control method according to any one of the first aspect and the possible implementations of the first aspect.

It can be learned from the foregoing technical solutions that the embodiments of this application have the following advantages:

The terminal device associates the meteorological information of the target area in the current periodicity with the display attribute (including the color and/or the brightness) of the target object by using the to-be-displayed information. Information displayed by the terminal device in the always on display state is no longer displayed in a single color all the time, but different display attributes may be presented based on different meteorological information in different periodicities, to present different visual effects.

DESCRIPTION OF EMBODIMENTS

The embodiments of this application provide an always on display control method, so that in an always on display state, a terminal device can determine corresponding to-be-displayed information based on meteorological information of a target area in a current periodicity, can determine a display attribute of a target object based on the to-be-displayed information, and display the target object whose display attribute is determined. It should be noted that the terminal device described in this application is a terminal device having a display, and may be an intelligent terminal such as a mobile phone, a tablet computer, or a smart watch. The terminal device is not specifically limited herein. For ease of description, an example in which the terminal device is a mobile phone is used in subsequent embodiments. Before the embodiments are described, a related structure of a display of the mobile phone in the embodiments of this application and some concepts that may appear in the embodiments of this application are first described. It should be understood that the related structure of the display the mobile phone is only an example of a part related to the embodiments of this application, and the following description of the related structure of the display of the mobile phone and explanations of the related concepts may be limited due to a specific situation of the embodiments of this application. However, this does not mean that this application is limited to only the specific situation. Specific situations of different embodiments may also differ. This is not specifically limited herein.

Figure 1:
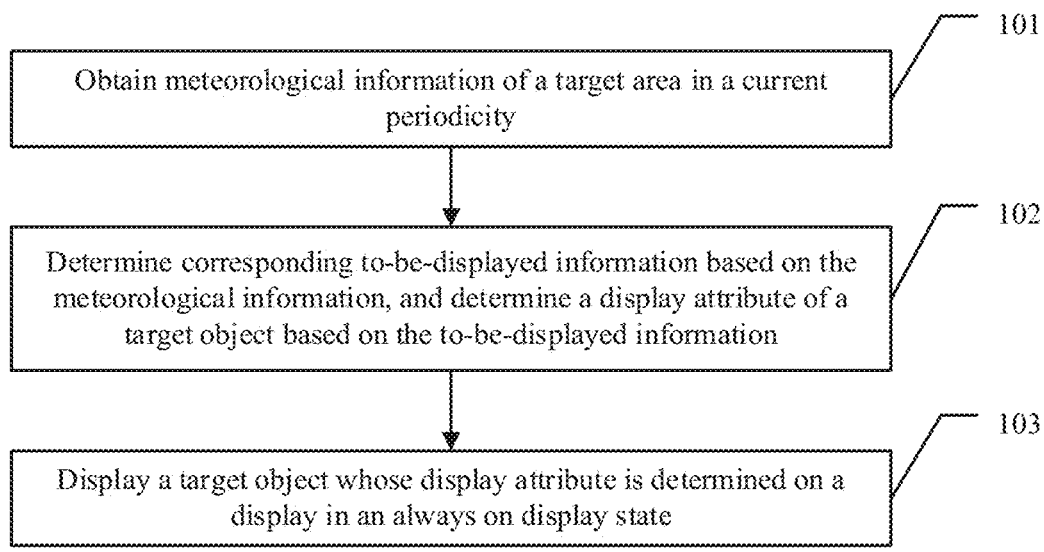
FIG. 1 is a schematic diagram of an embodiment of an always on display control method according to this application.

Currently, the display of the mobile phone commonly used in the market includes a liquid crystal display (liquid crystal display, LCD) display and an organic light-emitting diode (organic light-emitting diode, OLED) display. In a structure of the LCD display, a liquid crystal cell is disposed between two parallel glass substrates, a thin film transistor (thin film transistor, TFT) is disposed on a lower glass substrate, and a color filter is disposed on an upper glass substrate. A rotation direction of a liquid crystal molecule is controlled by changing a signal and a voltage on the TFT, to control whether each pixel on the display to emit polarized light to display. The OLED display uses a very thin coating of organic materials (also referred to as an organic light emitting layer) and a glass substrate, and the organic materials emit light when an electric current passes through the organic materials. Both mobile phones using the two types of displays support an AOD mode. In the AOD mode (also referred to as an AOD state), information such as time, a date, and a notification may be displayed in some areas on the display of the mobile phone. The information may be presented on the display of the mobile phone in various different presentation manners. For example, a presentation form of time may be a watch dial form or an Arabic number form, and a presentation form of a notification may be a small icon of an application or text. This is not specifically limited herein. It should be noted that although both a mobile phone having an LCD display and a mobile phone having an OLED display support the AOD mode, manners of implementing an AOD function by the two types of mobile phones are different. A characteristic of the OLED display is that each pixel on the OLED display can emit light independently. An AOD principle of the OLED display is that only some pixels on the OLED display are lit up to display information such as time, a date, and a notification. On the LCD display, a small area is marked out on the entire display. Information such as time, a date, and a notification is displayed in the small area, while an area other than the small area is displayed in pure black. In the embodiments of this application, a touch panel may further cover the display of the mobile phone, and information are input and output by using the touch panel. In some bezel-less mobile phones, the mobile phone may further include an in-screen fingerprint sensor (for example, an optical fingerprint sensor or an ultrasonic fingerprint sensor). This is not specifically limited herein. Refer to FIG. 1. A specific implementation is as follows:

101: Obtain meteorological information of a target area in a current periodicity.

The meteorological information of the target area in the current periodicity may be obtained by using a related application (for example, a weather application) installed on the mobile phone, or the meteorological information of the target area in the current periodicity may be obtained by using a related sensor apparatus built in the mobile phone. This is not specifically limited herein. It should be noted that the target area may be an area in which the mobile phone is located (for example, if a user carrying the mobile phone is located in Shenzhen, the target area is Shenzhen), or an area already set by the user on the mobile phone (for example, although the user carrying the mobile phone is located in Shenzhen, the user is resident in Changsha before, and Changsha is set as the target area on the mobile phone). It should be further noted that the meteorological information in this embodiment of this application may be a sunrise moment and a sunset moment (for example, on Mar. 5, 2019, the sunrise moment in Shenzhen is 6:40 and the sunset moment is 18:20), or a weather condition (for example, sunny, cloudy, or rainy). The meteorological information is not specifically limited herein. In addition, the current periodicity described in this embodiment of this application is a periodicity for updating the meteorological information. For example, when the meteorological information is the sunrise moment and the sunset moment, the mobile phone may obtain the sunrise moment and the sunset moment once when a preset periodicity expires (for example, if a sunrise moment and a sunset moment of the next day are obtained at 23:00 every night, the current periodicity is 24 hours). When the weather information is the weather condition, the mobile phone may still be set to obtain the weather condition once when a preset periodicity expires (for example, if the weather condition is obtained at 6:00, 12:00, 18:00, and 24:00 every day, the current periodicity is 6 hours). The current periodicity may be determined by the user according to a use habit or an actual requirement of the user. This is not specifically limited herein.

102: Determine corresponding to-be-displayed information based on the meteorological information, and determine a display attribute of a target object based on the to-be-displayed information.

After obtaining the meteorological information of the target area in the current periodicity, the mobile phone determines, based on the obtained meteorological information, the to-be-displayed information corresponding to the obtained meteorological information. The to-be-displayed information may be in a plurality of forms such as text, code, or a pattern, and is mainly used to reflect the meteorological information. For example, assuming that the meteorological information is the weather condition (for example, a sunny day, and the sky is blue in a sunny day), the to-be-displayed information may be code, a symbol, text, or the like directly or indirectly related to blue, or may be a blue background pattern. These may directly or indirectly reflect the meteorological information. This is not specifically limited herein. Then, the terminal device may determine the display attribute of the target object based on the to-be-displayed information. The display attribute may be a color (for example, different colors or a change of a gradient color) or brightness. This is not specifically limited herein. Preferably, in some implementations of this application, the to-be-displayed information includes N background patterns, where N is a positive integer. For ease of description, the following uses an example in which the to-be-displayed information is a background pattern for description.

After obtaining the meteorological information of the target area in the current periodicity, the mobile phone determines, based on the obtained meteorological information, a target background pattern corresponding to the obtained meteorological information. The target background pattern is one of the N background patterns, and the N background patterns may be built in the mobile phone in advance, or may be obtained by the mobile phone from a network in real time in the current periodicity. This is not specifically limited herein. It should be noted that the background pattern in this embodiment of this application may be randomly selected, or may be selected according to a preset rule. For example, there may be a correspondence between the background pattern and zodiac information. For example, as time passes in a day, the background pattern switches based on zodiac pictures (12 background patterns related to the zodiac are built in the mobile phone in advance). The background pattern changes every two hours. The user knows the time when viewing the background pattern. For another example, there may be a correspondence between the background pattern and the meteorological information, and the user knows the corresponding meteorological information based on the background pattern presented on the display of the mobile phone in an AOD state. A color of the background pattern may be a plurality of colors, or may be a gradient color. This is not specifically limited herein. Preferably, information included in the background pattern in this embodiment of this application may directly or indirectly reflect the corresponding meteorological information.

Figure 2:
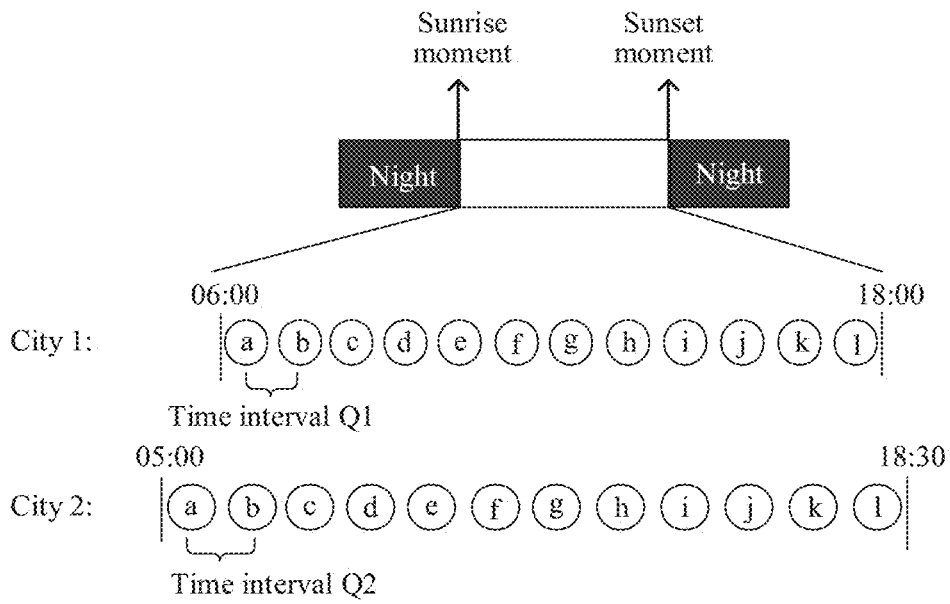
FIG. 2 is a schematic diagram of determining a corresponding target background pattern based on a sunrise moment and a sunset moment according to an embodiment of this application.

Optionally, the mobile phone may determine the corresponding target background pattern based on the meteorological information in the following manners:

(1) A Manner Used when the Meteorological Information is the Sunrise Moment and the Sunset Moment:

After obtaining the sunrise moment and the sunset moment of the target area, the mobile phone may determine duration X between the sunrise moment and the sunset moment based on the obtained sunrise moment and sunset moment, and may further determine a time interval P between the sunrise moment and the sunset moment. The background pattern has been obtained in advance (for example, the mobile phone obtains the background pattern from the network or the background pattern is built in the mobile phone in advance). Therefore, the mobile phone may also determine a quantity N of all background patterns. Further, the terminal device may determine interval duration Y (where Y=X/N) based on the duration X and the quantity N, and may obtain N time intervals Q by equally dividing the time interval P according to the interval duration Y. Finally, the terminal device may determine, according to a preset rule, a target background pattern corresponding to each time interval. For ease of understanding, FIG. 2 is used as an example herein. 12 background patterns ("a, b, c, . . . k, and l" in FIG. 1) are built in the mobile phone in advance. When a user A who uses the mobile phone is located in a city 1 (for example, the target area is set to an area in which the mobile phone is located), the mobile phone has learned, at 23:00 last night, that the sunrise moment of the city 1 is 6:00 and the sunset moment of the city 1 is 18:00 on the current day. In this case, the mobile phone may determine that duration X1 between the sunrise moment and the sunset moment of the city 1 is 12 hours, a time interval P1 between the sunrise moment and the sunset moment is 6:00 to 18:00. Because the background patterns are built in the mobile phone in advance, the mobile phone may also determine that a quantity N1 of background patterns is 12. Then, the mobile phone may obtain interval duration Y1=X1/N1=1 hour, and further, the mobile phone may obtain 12 time intervals Q1 with same duration by evenly dividing the time interval P1 (that is, 6:00 to 18:00) according to the interval duration 1 hour. The 12 time intervals Q1 are respectively 6:00 to 7:00, 7:00 to 8:00, 8:00 to 9:00 . . . 16:00 to 17:00, and 17:00 to 18:00. Each time interval Q1 corresponds to one background pattern (for example, the correspondence may be built in the mobile phone in a mapping manner), and the mobile phone may determine, based on the correspondence, a background pattern corresponding to each time interval Q1. Similarly, when the user A who carries the mobile phone is located in a city 2, the mobile phone learns that the sunrise moment of the city 2 is 5:00 and the sunset moment of the city 2 is 18:30 on the current day. In this case, the mobile phone may determine that duration X2 between the sunrise moment and the sunset moment of the city 2 is 13.5 hours, and a time interval P2 between the sunrise moment and the sunset moment is 5:00 to 18:30. Because the background patterns are built in the mobile phone in advance, a quantity N2 of background patterns remains unchanged (that is, N2=N1=12). Then, the mobile phone may obtain interval duration Y2=X2/N2=1.125 hours, and further, the mobile phone may obtain 12 time intervals Q2 with same duration by evenly dividing the time interval P2 according to the interval duration 1.125 hours. Similarly, each time interval Q2 corresponds to one background pattern, and the mobile phone may determine, based on the correspondence, a background pattern corresponding to each time interval Q2.

Figure 3:
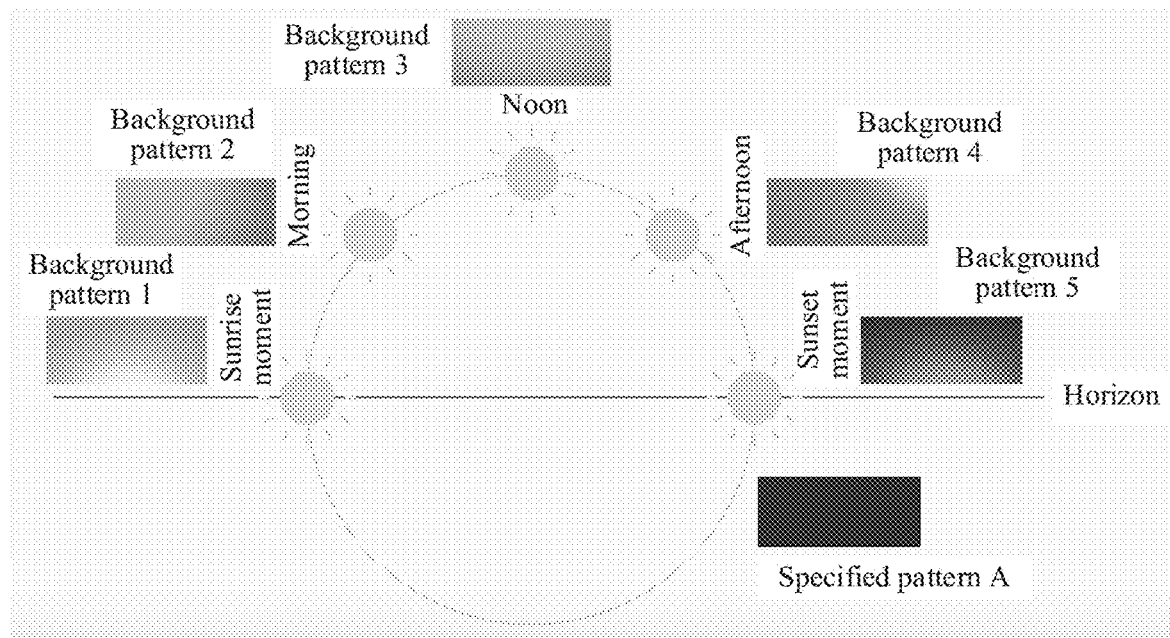
FIG. 3 is a schematic diagram of a display rule of a background pattern according to an embodiment of this application.
Figure 4A:
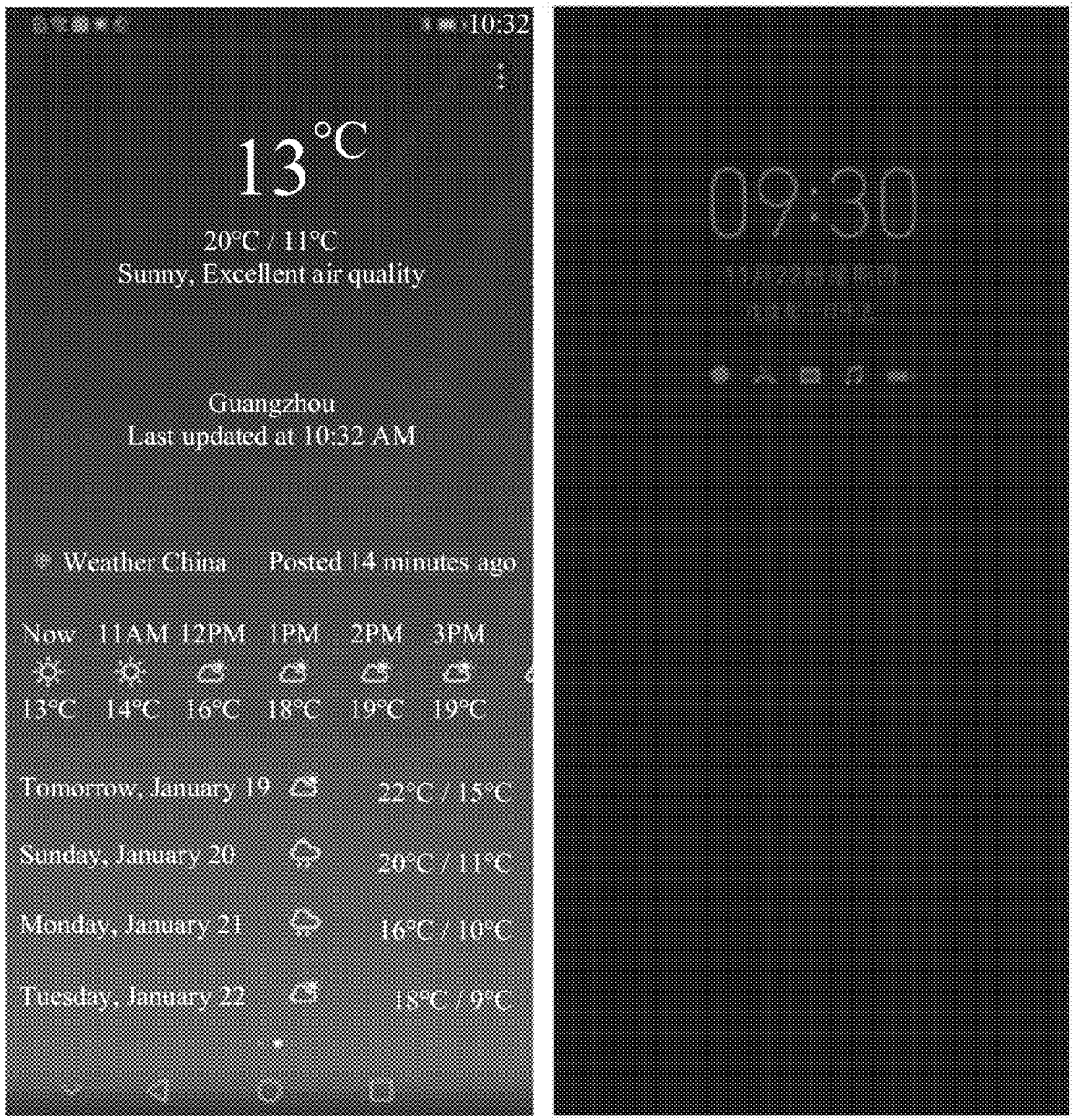
FIG. 4A to FIG. 4D are a schematic diagram of a correspondence between a weather condition and a display attribute of a background pattern according to an embodiment of this application.
Figure 4B:
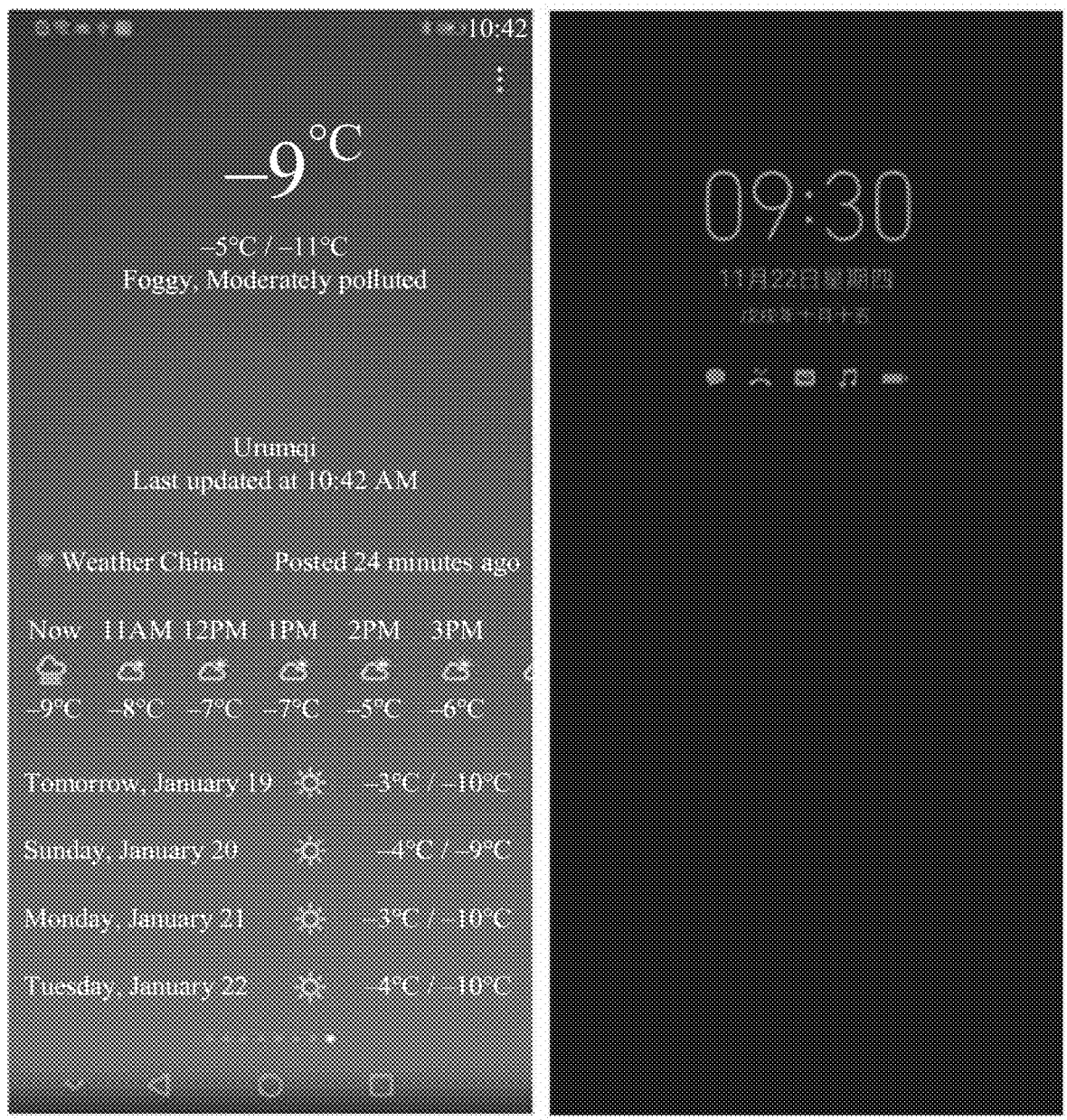
Figure 4C:
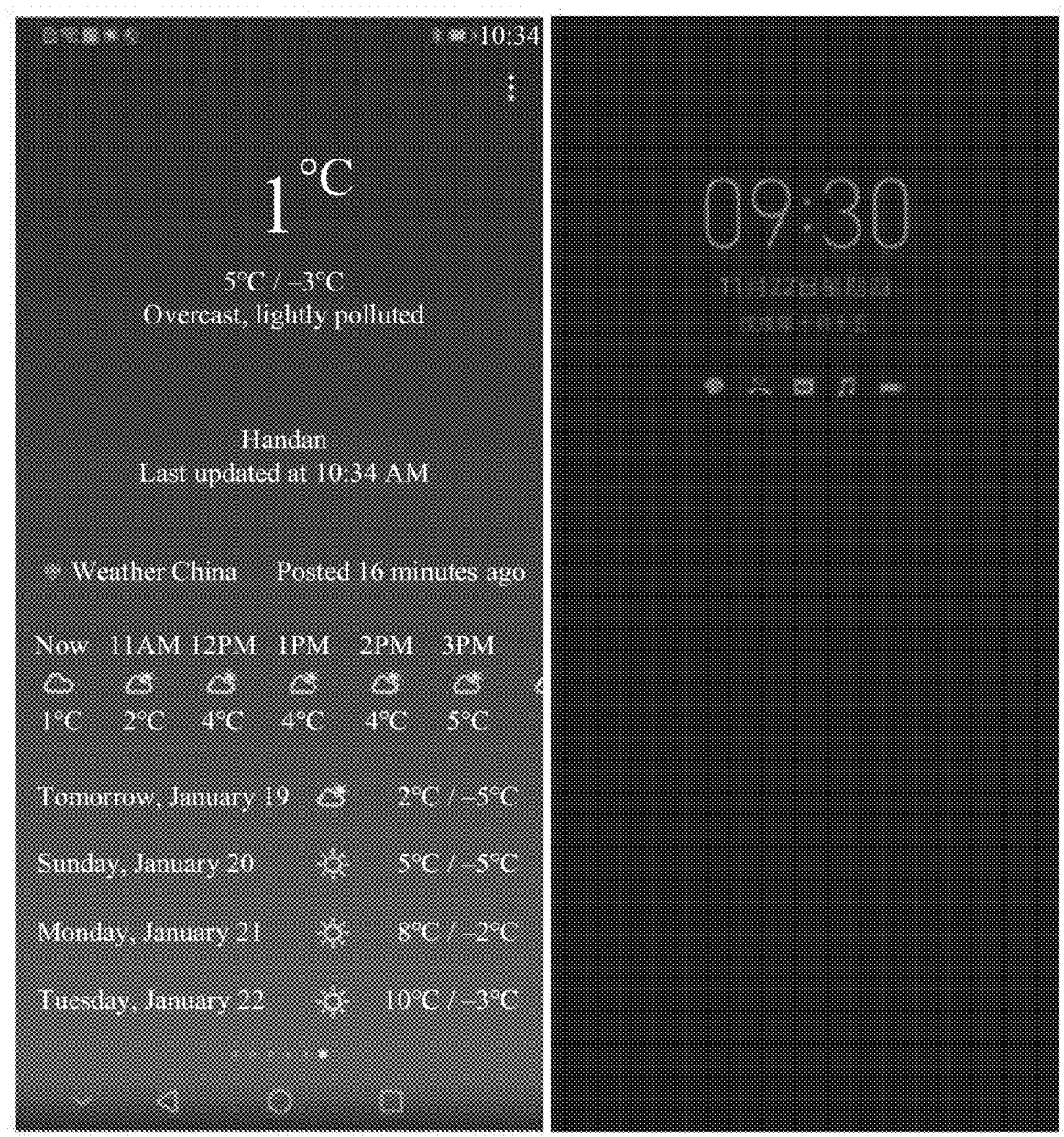
Figure 4D:
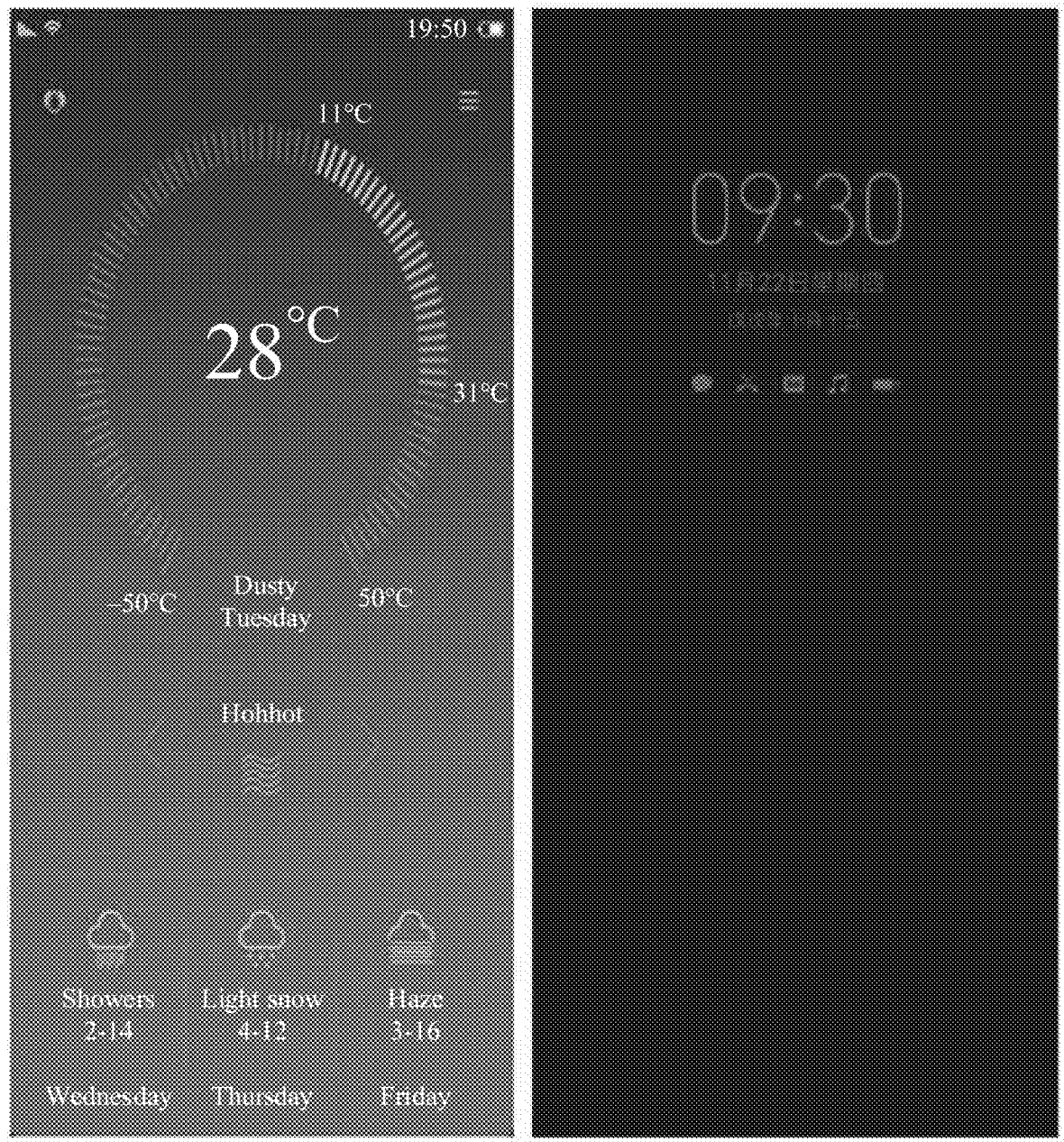
Figure 5A:
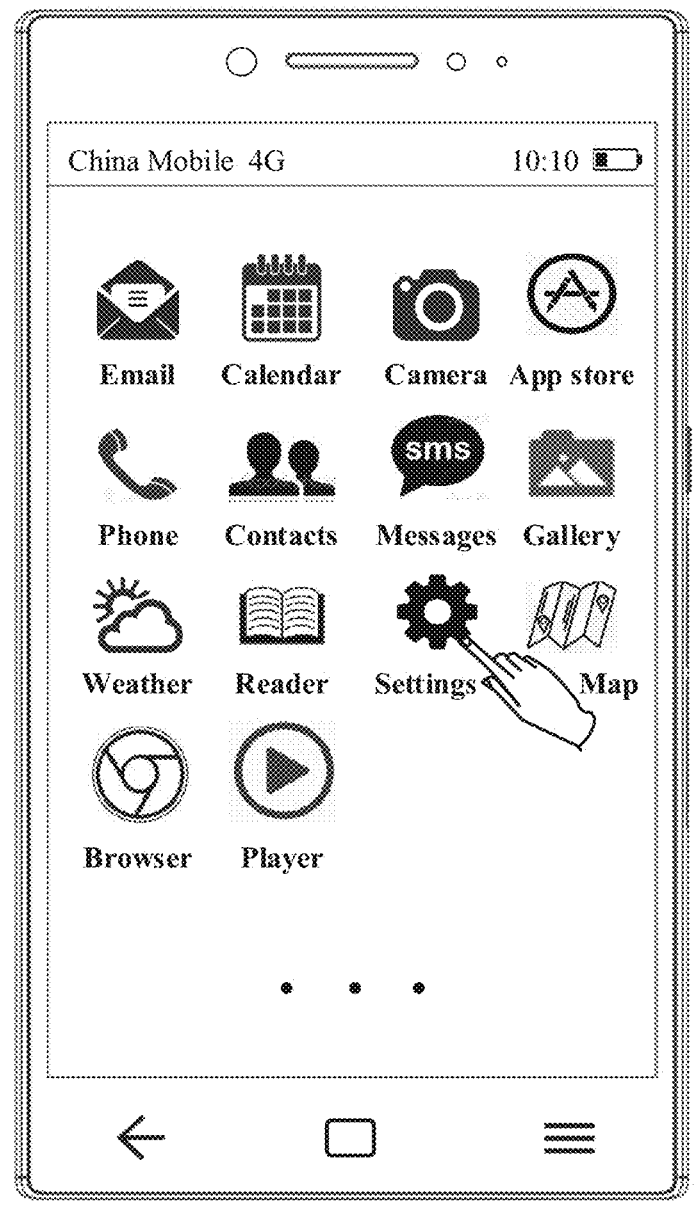
FIG. 5A to FIG. 5D are a schematic diagram of a specific operation process of setting a background pattern by a user according to an embodiment of this application.
Figure 5B:
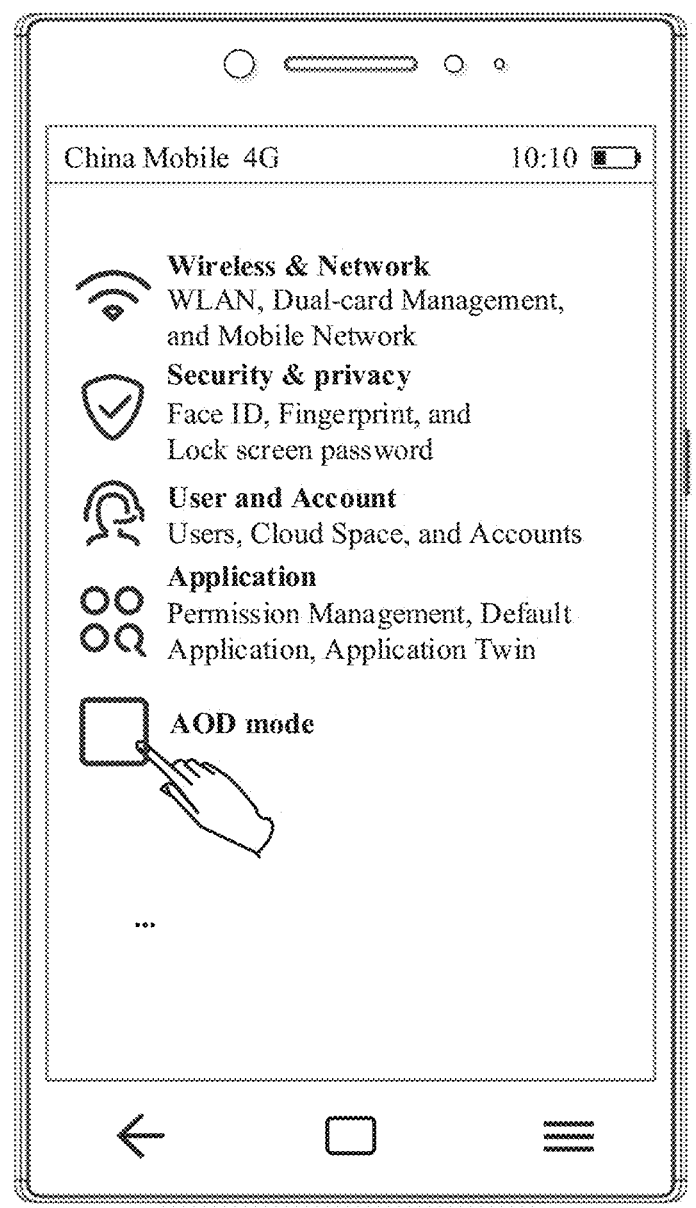
Figure 5C:
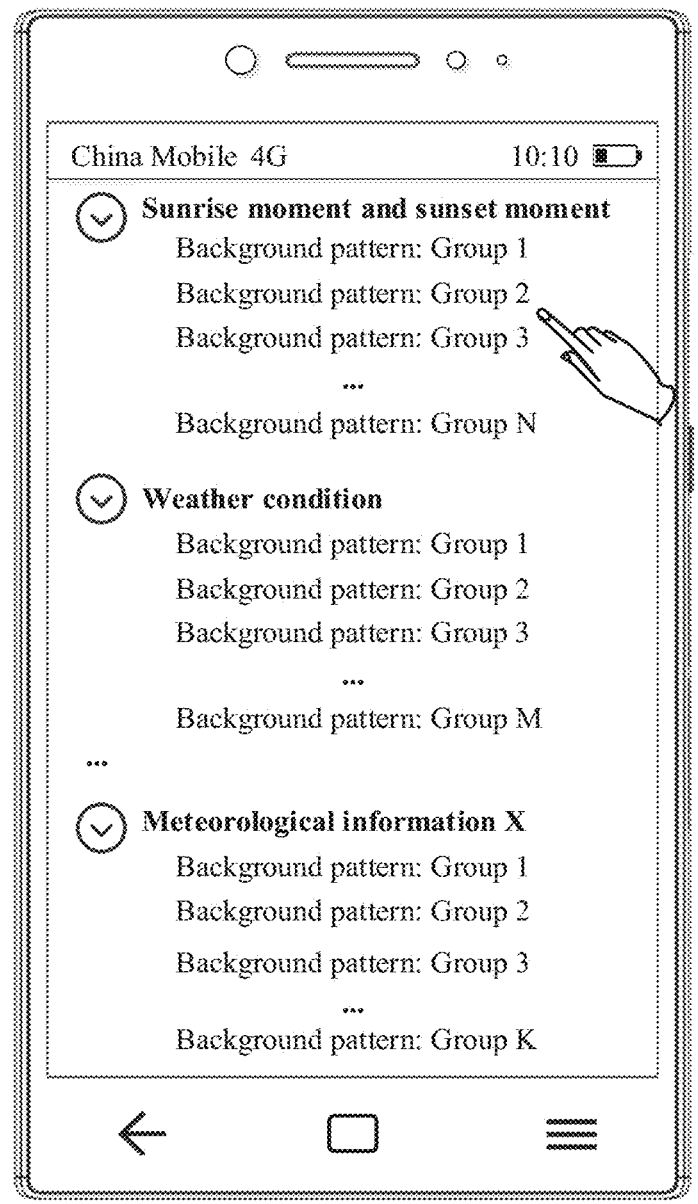
Figure 5D:
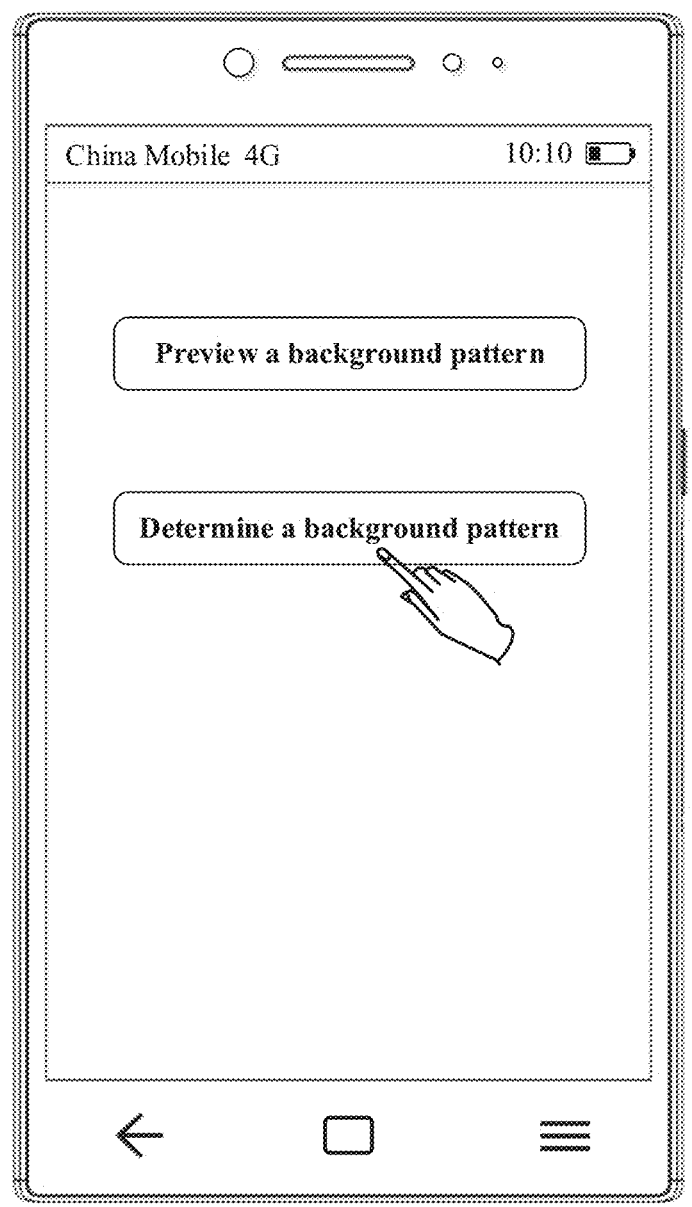

Preferably, information included in the background pattern in this embodiment of this application may reflect a change of a position of the sun in the sky in the time interval from the sunrise moment to the sunset moment. For example, as shown in FIG. 3, because the sun is in different positions at different time points after the sunrise in a day (that is, the solar altitude changes with time), the sky presents different colors. Based on this, the N background patterns may be in gradient colors, and are used to simulate a change of colors of the sky caused by a change of solar altitudes at different time points in a day. As shown in FIG. 3, when the sun just rises (that is, a moment 1: a sunrise moment), the sun is at the horizon. In this case, a background pattern simulates a color that is presented by the sky when the sun rises from the sea level. The sun is below the sky, and because the sun just rises, a color of the sun is light yellow. Because the sky is light blue at the break of dawn, a background pattern 1 corresponding to the moment 1 may be in an arc-shaped gradient color, and a color change from bottom to top (that is, a situation in which the sun just rises is simulated) is from light yellow to light blue successively. When the sun rises to midair (that is, a moment 2: morning), a background pattern simulates a color that is presented by the sky when the sun is in midair in the east. In this case, a color of the sun is brighter than a color that is presented when the sun just rises, and the color of the sky is also brighter under the sun. Therefore, a background pattern 2 corresponding to the moment 2 may be in an arc-shaped gradient color, and a color change in a direction from the upper left 45° to the lower right 45° (that is, a situation in which the sun is in midair in the east is simulated) is from light yellow to flesh pink to lake blue. When the sun rises directly above the sky (that is, a moment 3: noon), a background pattern simulates a color that is presented by the sky when the sun rises directly above the sky. In this case, a color of the sun is more dazzling than the color of the sun in the morning, and the color of the sky also changes slightly. Therefore, a background pattern 3 corresponding to the moment 3 may be in an arc-shaped gradient color, and a color change from top to bottom (that is, a situation in which the sun is directly above the sky) is from lavender to lake blue successively. When the sun sinks to midair (that is, a moment 4: afternoon), a background pattern simulates a color that is presented by the sky when the sun is in midair in the west. In this case, a color of the sun is milder than the color of the sun at the noon, and the color of the sky is also darker. Therefore, a background pattern 4 corresponding to the moment 4 may be in an arc-shaped gradient color, and a color change in a direction from the upper right 45° to the lower left 45° (that is, a situation in which the sun is in midair in the west is simulated) is from orange to pink to dark blue. When the sun sets (that is, a moment 5: a sunset moment), a background pattern simulates a color that is presented by the sky when the sun is just about to sink below the horizon. The sun is below the sky, a color of the sun is a color of a typical sunset, and the color of the sky also becomes a little dark under the sun. Therefore, a background pattern 5 corresponding to the moment 5 may be in an arc-shaped gradient color, and a color change from bottom to top (that is, a situation in which the sun is about to sink below the horizon is simulated) is from reddish orange to purple to dark blue. It should be noted that in FIG. 3, the background pattern 1 to the background pattern 5 are provided only for illustration, and are used to simulate color changes presented when the sun is at different altitudes in the sky in a day. Therefore, the foregoing detailed description of the gradient color of the background pattern by using FIG. 3 as an example is merely an example, is merely for ease of understanding, and cannot be considered as a limitation on the background pattern in this embodiment of this application. For example, in target areas with different longitudes and latitudes, even the sun is at a same altitude in the sky during a day, colors of the sun may be different. Therefore, in some implementations of this application, the user may voluntarily set the color of the background pattern according to an actual requirement or a personal preference. For example, The user may not select the arc-shaped gradient color of the background pattern 1 (that is, the background pattern corresponding to the moment 1) as light yellow to light blue, and may voluntarily set the arc-shaped gradient color to another gradient color (for example, orange to gray blue, or reddish orange to purple blue). This is not specifically limited herein. It should be further noted that, in some implementations of this application, after the user sets a color change of a background pattern, the user may further preview the color change in real time. For example, within preset duration (for example, 4 seconds), the mobile phone displays colors matched by the user for the background pattern. That is, colors presented by the sky in a period from sunrise to sunset are displayed, to improve user experience.

It should be further noted that, when the meteorological information in this embodiment of this application is a time interval after a sunset moment and before a sunrise moment or extreme meteorological information (for example, a polar night or a polar day) in the target area (for example, the Arctic or the Antarctic), or when the mobile phone cannot obtain information about the sunrise moment or the sunset moment in the current periodicity, a target background pattern corresponding to the meteorological information in this case may be a background pattern specified in the N background patterns in advance (for example, in the time interval after the sunset moment and before the sunrise moment, it is specified that a target background pattern corresponding to the time interval is the background pattern 1 in FIG. 3), or may be another specified pattern (for example, a specified pattern A in FIG. 3, the specified pattern A is not m the N background patterns) that does not belong to the N background patterns.

(2) A Manner Used when the Meteorological Information is the Weather Condition:

After obtaining the weather condition of the target area, the mobile phone may search, by using a mapping relationship, the N background patterns for a target background pattern corresponding to the weather condition, and determine, based on the mapping relationship, the target background pattern corresponding to the weather condition. Preferably, information included in the background pattern in this embodiment of this application may reflect the weather condition. For example, a weather condition corresponds to a background pattern in one color. For example, as shown in FIG. 4A to FIG. 4D, a sunny day may correspond to a blue background pattern, a dusty day may correspond to a khaki background pattern, a cloudy day may correspond to a gray background pattern, and a foggy day may correspond to a light green background pattern.

It should be noted that when the mobile phone cannot obtain the weather condition in the current periodicity or when the weather condition obtained by the mobile phone does not have a mapping relationship, the corresponding target background pattern may be a background pattern specified in the N background patterns in advance (for example, a khaki background pattern is specified as a corresponding background pattern used when the weather condition in the current periodicity cannot be obtained), or may be another specified pattern that does not belong to the N background patterns. This is not specifically limited herein.

It should be further noted that, in some implementations of this application, one type of meteorological information may correspond to a plurality of groups of background patterns, and different types of meteorological information may correspond to different types of background patterns. For example, when the meteorological information is the sunrise moment and the sunset moment, the meteorological information may correspond to N groups of background patterns (which may be labeled as, for example, a group 1, a group 2, a group 3, . . . , and a group N), and each group of background patterns includes P background patterns, where N is a positive integer greater than or equal to 1, and P is a positive integer greater than 1. Similarly, when the meteorological information is the weather condition, the meteorological information may correspond to M groups of background patterns (which may be labeled as, for example, a group 1, a group 2, a group 3, . . . , and a group M), and each group of background patterns may also include Q background patterns, where M is a positive integer greater than or equal to 1, and Q is a positive integer greater than 1. By analogy, a quantity of types and groups of background patterns that are built in the foregoing manner may be set based on a quantity of types of meteorological information. After the background patterns are set, the user may select, according to a personal preference or an actual requirement, a group of background patterns of a type that is to be used to display corresponding meteorological information. For ease of understanding, FIG. 5A to FIG. 5D are used as an example to illustrate a specific operation process in which the user sets a background pattern.

The user taps a "settings" icon on the home screen of the mobile phone to enter a lower-level interface, and finds an "AOD mode" in the lower-level interface. After the user taps the "AOD mode" and the mobile phone enters the "AOD mode", the user may view various different meteorological information and a plurality of groups of stored background patterns corresponding to the meteorological information on the display of the mobile phone. The upper right diagram in FIG. 5A to FIG. 5D show the meteorological information: a sunrise moment and a sunset moment and corresponding N groups of background patterns, the meteorological information: a weather condition and corresponding M groups of background patterns, . . . , and the meteorological information: meteorological information X and corresponding K groups of background patterns. The user may select, according to a personal preference or an actual requirement of the user, a specific type of meteorological information and a group of background patterns corresponding to the meteorological information. In FIG. 5A to FIG. 5D, the user selects an option of the sunrise moment and the sunset moment, and a corresponding background pattern 2. Then, the user may directly tap "determine a background pattern", to complete the setting of the corresponding AOD mode. Alternatively, the user may select to tap "preview a background pattern", so that the mobile phone may first successively present all background patterns in the background pattern group 2 in preset duration (for example, 3 seconds), and the user may determine, based on an effect of the previewed background patterns, whether to select this background pattern group.

It should be noted that FIG. 5A to FIG. 5D and corresponding descriptions are examples. Content presented on the display of the mobile phone is simply described to describe the correspondence between the background pattern and the meteorological information and a setting procedure in this embodiment of this application. In actual application, the display of the mobile phone may include more content. This is not specifically limited herein. It should be further noted that, in the embodiment corresponding to FIG. 5A to FIG. 5D, setting of the AOD mode of the mobile phone is on a lower-level page of "settings". Actually, the setting of the AOD mode may alternatively be on a lower-level page of another application. FIG. 5A to FIG. 5D are used for merely illustration, and this is not specifically limited herein.

After determining the corresponding target background pattern based on the meteorological information, the mobile phone may determine a display attribute of the target background pattern based on the target background pattern. The display attribute may be a color attribute or brightness. This is not specifically limited herein. For example, when the meteorological information is the sunrise moment and the sunset moment, the display attribute of the target background pattern may be the color attribute (for example, the gradient colors described in the background pattern 1 to the background pattern 5 in FIG. 3 correspond to color changes presented by the sky when the sun is at different altitudes). When the meteorological information is the weather condition, the display attribute of the target background pattern may be still the color attribute (for example, khaki (corresponding to a dusty day), gray (corresponding to a cloudy day), or blue (corresponding to a sunny day)), or brightness (for example, 30% brightness of a background pattern on a cloudy day and 70% brightness of a background pattern on a sunny day when both the background patterns are blue)

Figure 6:
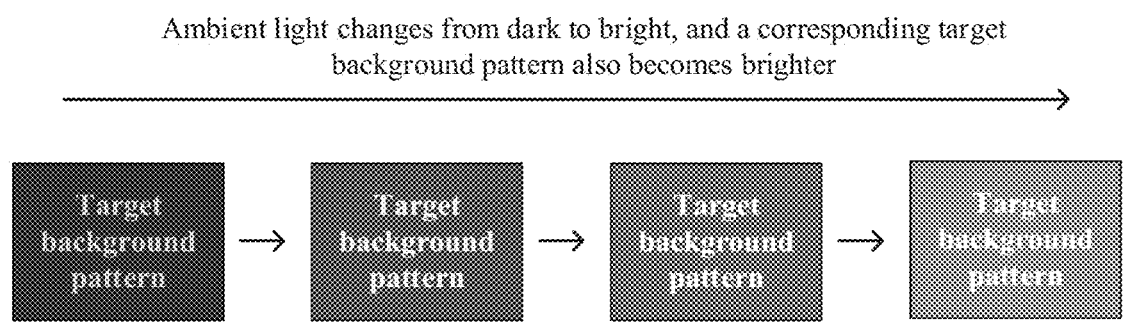
FIG. 6 is a schematic diagram of a change of a target background pattern with a change of ambient light brightness according to an embodiment of this application.

It should be noted that, in some implementations of this application, the display attribute of the target background pattern may alternatively be a color attribute and brightness. In this case, that the mobile phone determines the display attribute of the target background pattern may be: The mobile phone first obtains ambient light brightness of an environment in which the mobile phone is located, and determines the brightness of the target background pattern based on the ambient light brightness. For example, as shown in FIG. 6, ambient light of the environment in which the mobile phone is located changes from dark to bright, and a corresponding target background pattern also changes from dark to bright.

Figure 7:
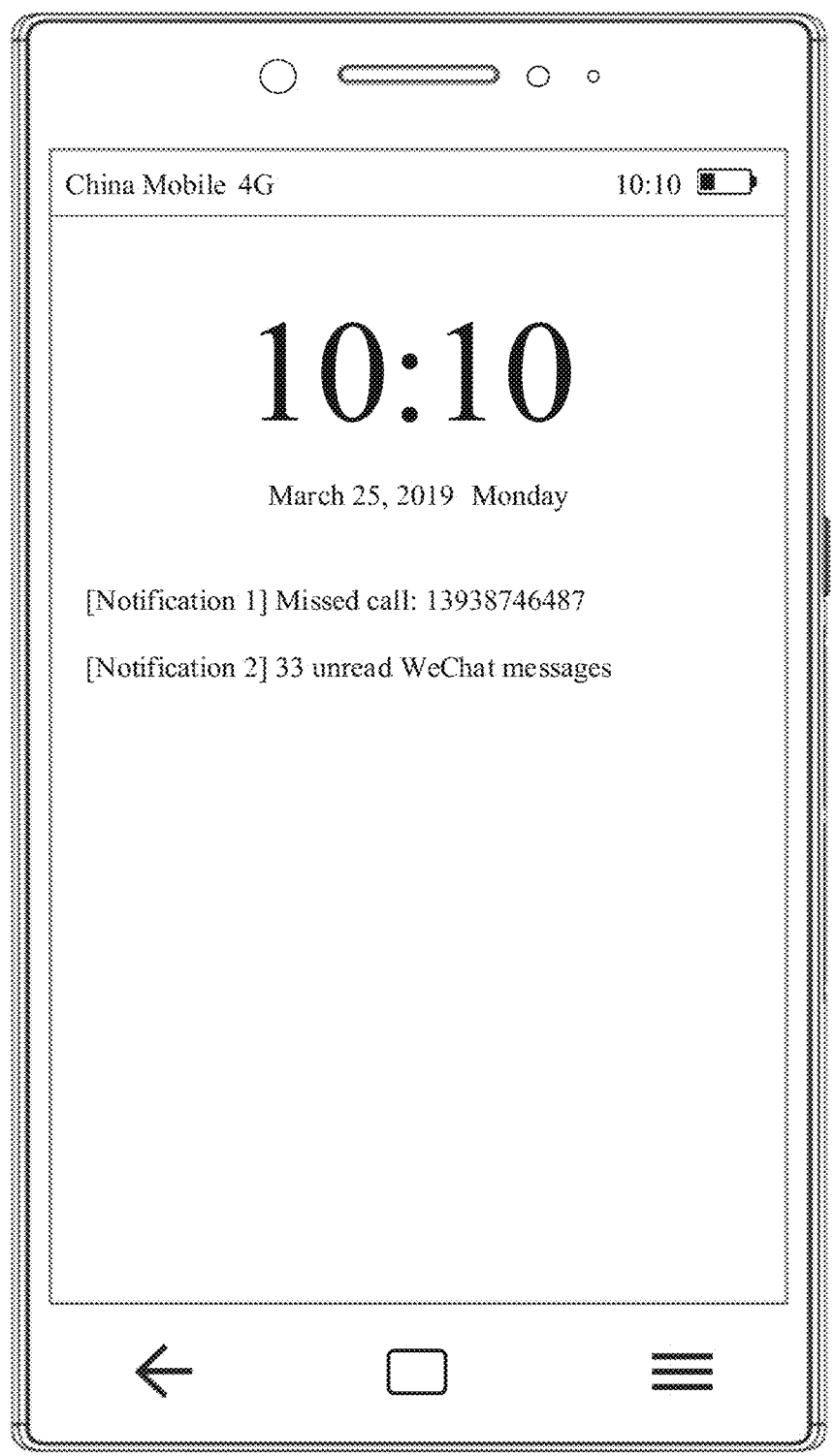
FIG. 7 is a display effect diagram of a target object on a display of a mobile phone in an always on display state according to an embodiment of this application.
Figure 8:
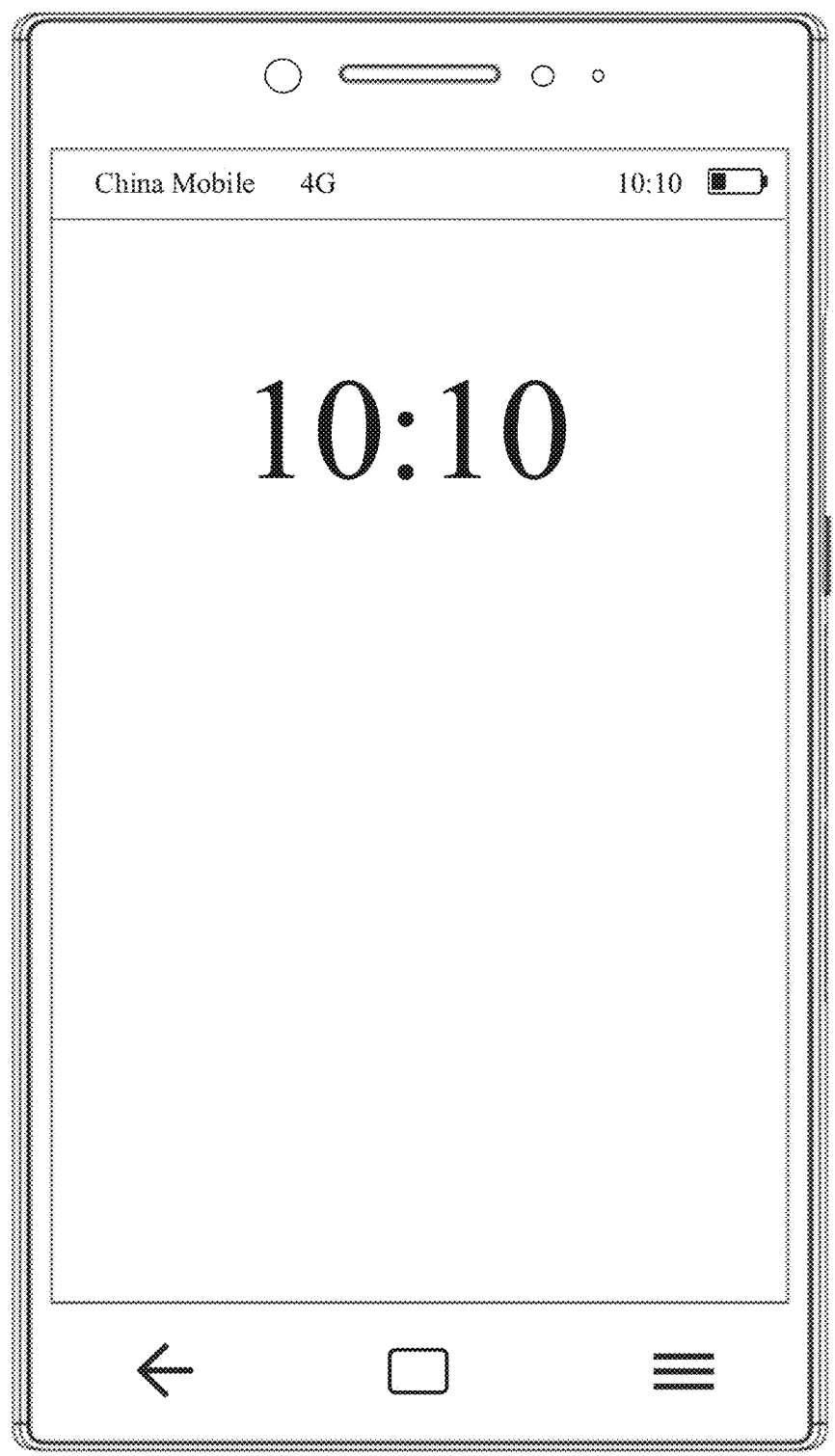
FIG. 8 is another display effect diagram of a target object on a display of a mobile phone in an always on display state according to an embodiment of this application.
Figure 9:
FIG. 9 is another display effect diagram of a target object on a display of a mobile phone in an always on display state according to an embodiment of this application.
Figure 10:
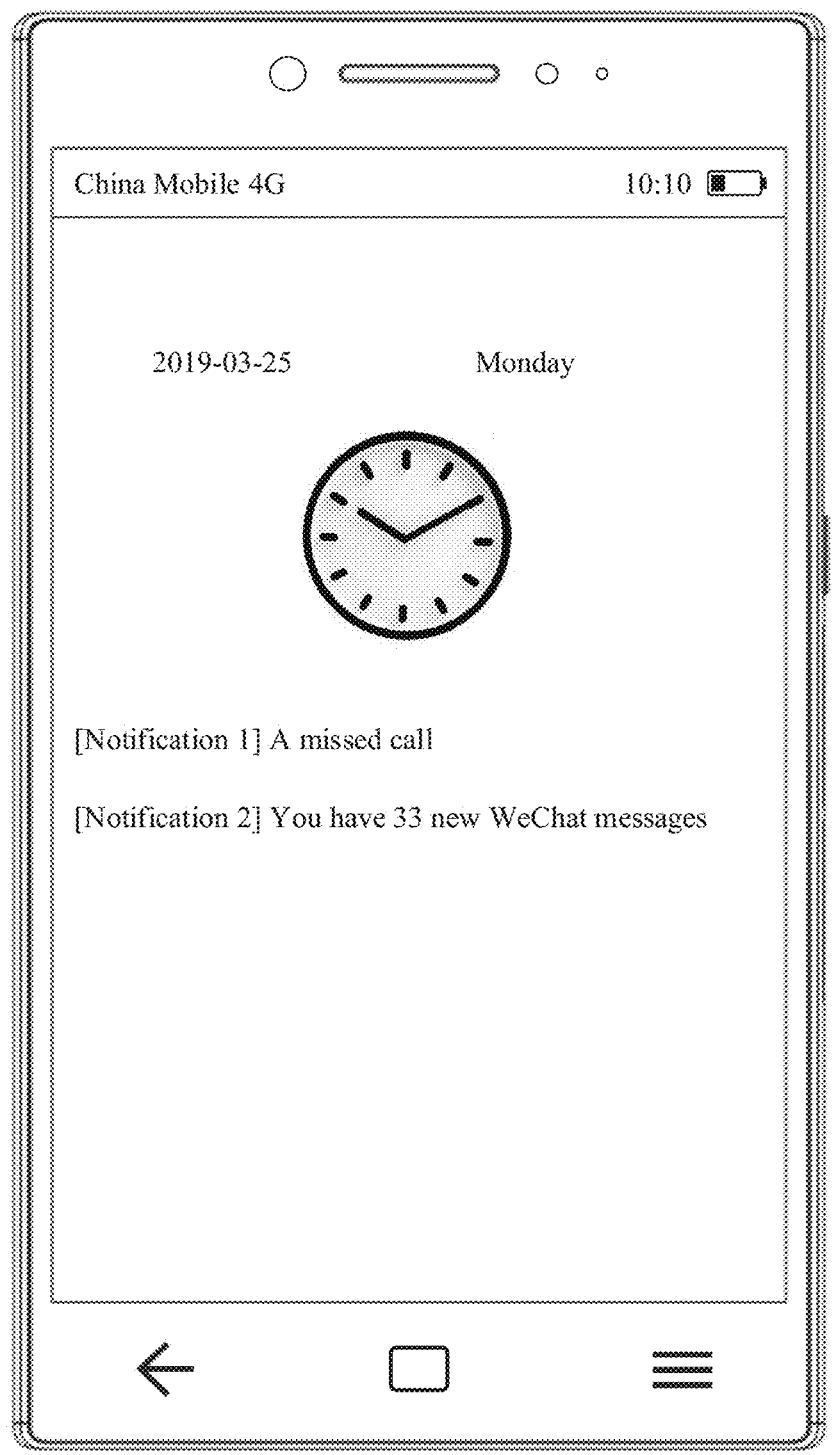
FIG. 10 is another display effect diagram of a target object on a display of a mobile phone in an always on display state according to an embodiment of this application.
Figure 11:
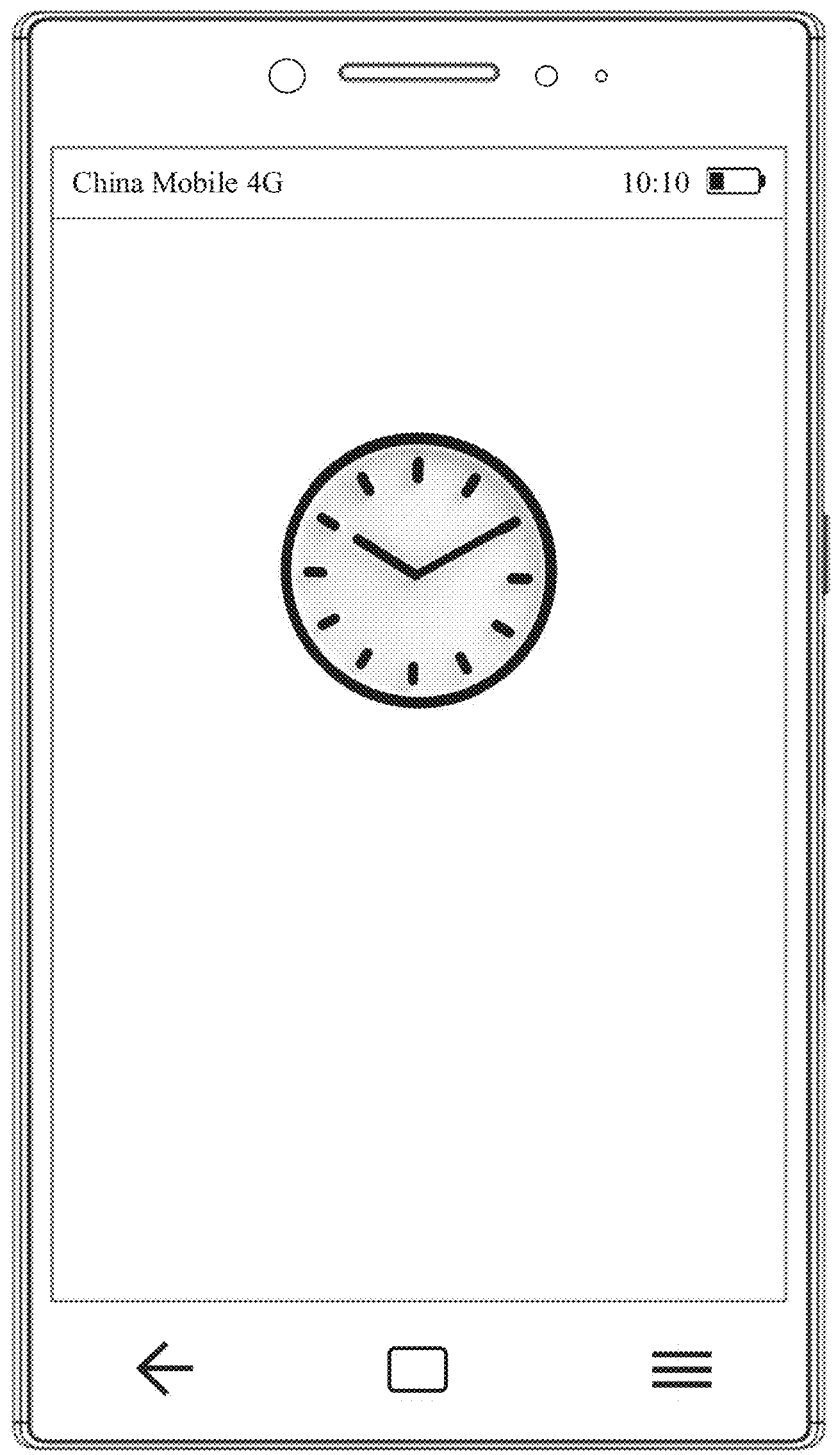
FIG. 11 is another display effect diagram of a target object on a display of a mobile phone in an always on display state according to an embodiment of this application.

After determining the display attribute of the target background pattern, the mobile phone determines the display attribute of the target object based on the display attribute of the target background pattern. The target object is information displayed on the display of the mobile phone in the AOD mode, and may be all information displayed on the display of the mobile phone in the AOD mode (for example, all the information displayed on the display of the mobile phone in the AOD mode includes time, a date, and a notification message, as shown in FIG. 7), or may be some information (for example, time, as shown in FIG. 8). This is not specifically limited herein. It should be further noted that all or some information displayed by the mobile phone in the AOD mode in FIG. 7 and FIG. 8 are merely examples. In actual application, the user may voluntarily set, according to an actual requirement or a personal preference of the user, information that needs to be displayed in the AOD mode. FIG. 9 shows another display manner voluntarily set by the user in the AOD mode of the mobile phone, and information that needs to be displayed includes time, a target city, a date, real-time weather, and the like. It should be further noted that the notification message may also be displayed in a plurality of manners. FIG. 7 shows two notification messages. A specific notification message that needs to be displayed in the AOD mode may be voluntarily set by the user. Details are not described herein. It should be further noted that the information displayed on the display of the mobile phone in the AOD mode may have a plurality of presentation forms. This is not specifically limited herein. For example, display content corresponding to FIG. 7 may further have a presentation form shown in FIG. 10. Display content corresponding to FIG. 8 may further have a presentation form shown in FIG. 11.

Figure 12:
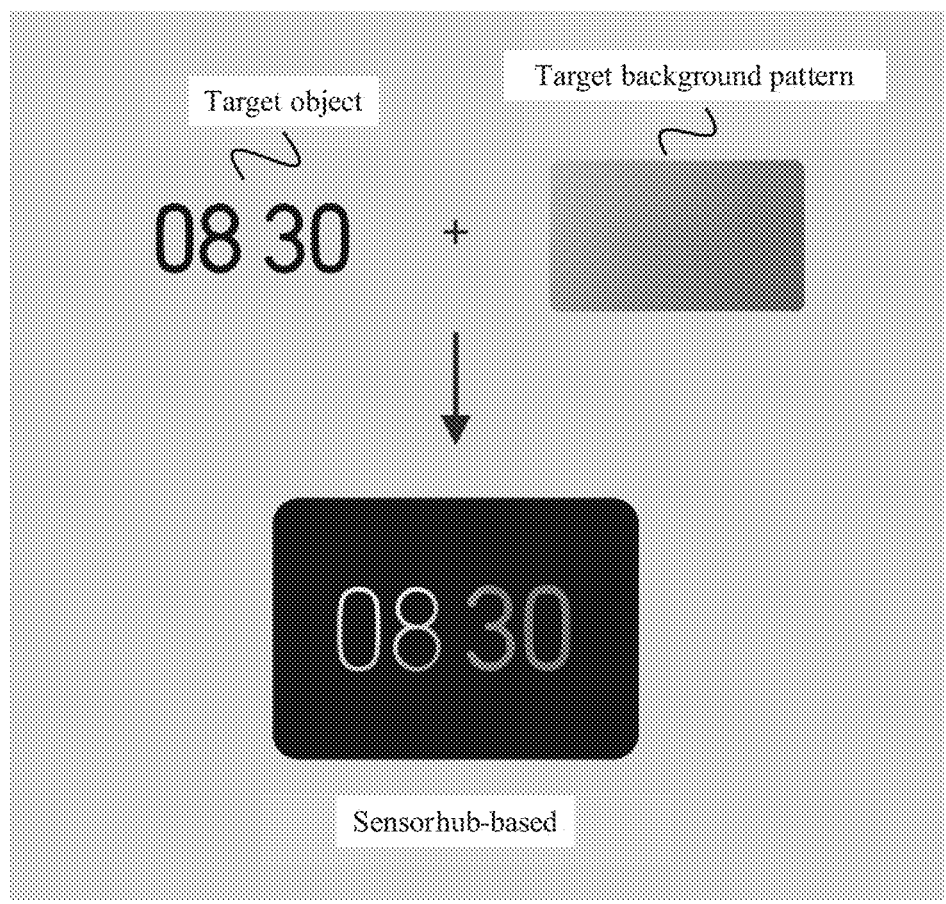
FIG. 12 is a schematic diagram of modifying a display attribute of a target object according to an embodiment of this application.
Figure 13:
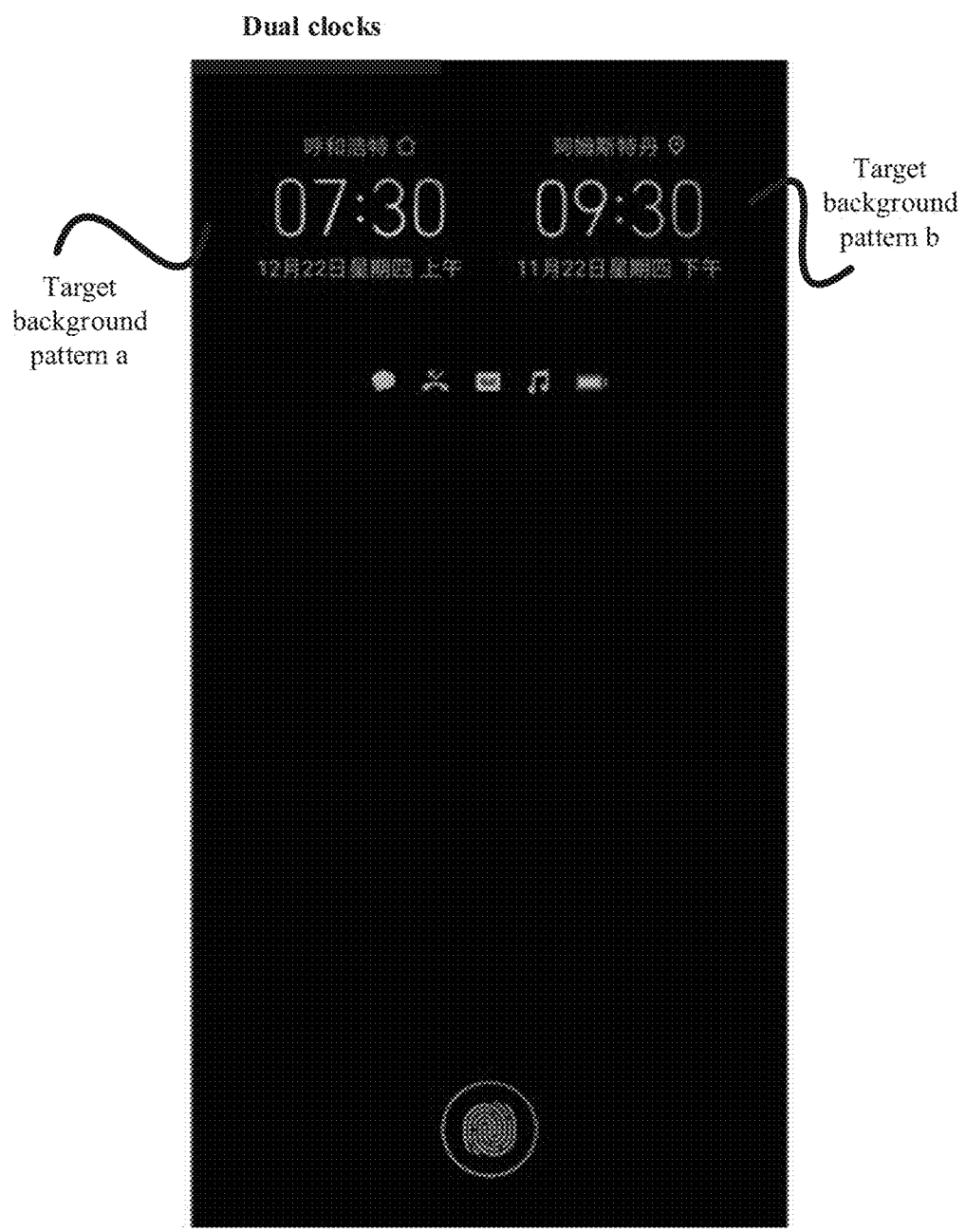
FIG. 13 is a schematic diagram of a display attribute of a target object when the target object is dual clocks according to an embodiment of this application.

It should be further noted that the mobile phone may determine the display attribute of the target object based on the display attribute of the target background pattern in a plurality of manners. For example, when the display attribute of the target object is consistent with the display attribute of the target background pattern, after the mobile phone determines the display attribute of the target background pattern, the mobile phone may maintain an original display attribute of the target object. When the display attribute of the target object is inconsistent with the display attribute of the target background pattern, the mobile phone may modify the display attribute of the target object based on the display attribute of the target background pattern. It should be noted herein that the mobile phone modifies the display attribute of the target object based on the display attribute of the target background pattern in a plurality of manners. This is not specifically limited herein. For example, as shown in FIG. 12, an example in which the target object is some information (for example, a digital clock) is used. The mobile phone may first perform, according to a calculated template, synthesis coloring on all information displayed in the AOD mode (for example, the digital clock, a date, and a notification message are all colored in black). Then, the mobile phone calculates a corresponding template based on the obtained display attribute (for example, a gradient color of the target background pattern) of the target background pattern, and performs synthesis coloring on the target object (namely, the digital clock, the target object is four numbers when a single clock is used, and the target object is eight numbers when dual clocks are used) according to the template again. That is, the digital clock originally colored in black is colored in a gradient color consistent with the target background pattern. Finally, information obtained after two times of synthesis coloring is combined by a Sensorhub and then displayed on the display. It should be noted that, the target object modified in FIG. 12 is a single-clock digital clock. When the digital clock is dual clocks, the target object is eight numbers. As shown in FIG. 13, each clock corresponds to a target background pattern. For example, in FIG. 13, a first clock 07:30 corresponds to a gradient color consistent with a color of a target background pattern a, and a second clock 09:30 corresponds to a gradient color consistent with a color of a target background pattern b.

Preferably, in some implementations of this application, all information presented by the mobile phone in the AOD mode may present different display attributes according to different target background patterns. For example, time, a date, and a notification message all present different display attributes (for example, a change of a gradient color) according to the different target background patterns. Alternatively, some information such as time in information (it is assumed that the mobile phone displays the time, a date, and a notification message in the AOD mode) presented by the mobile phone in the AOD mode may present different display attributes (for example, a change of a gradient color) according to the different target background patterns. Other information (for example, the date and the notification message) displayed in the always on display AOD mode presents another display attribute (for example, always in only black) irrelevant to the target background pattern. It should be noted that a fingerprint display on the mobile phone may also present different display attributes according to different target background patterns, or may present a fixed display attribute. This is not specifically limited herein.

103: Display, on the display in the always on display state, the target object whose display attribute is determined.

Figure 14:
FIG. 14 is a display effect diagram of a target object in an always on display state according to an embodiment of this application.
Figure 15:
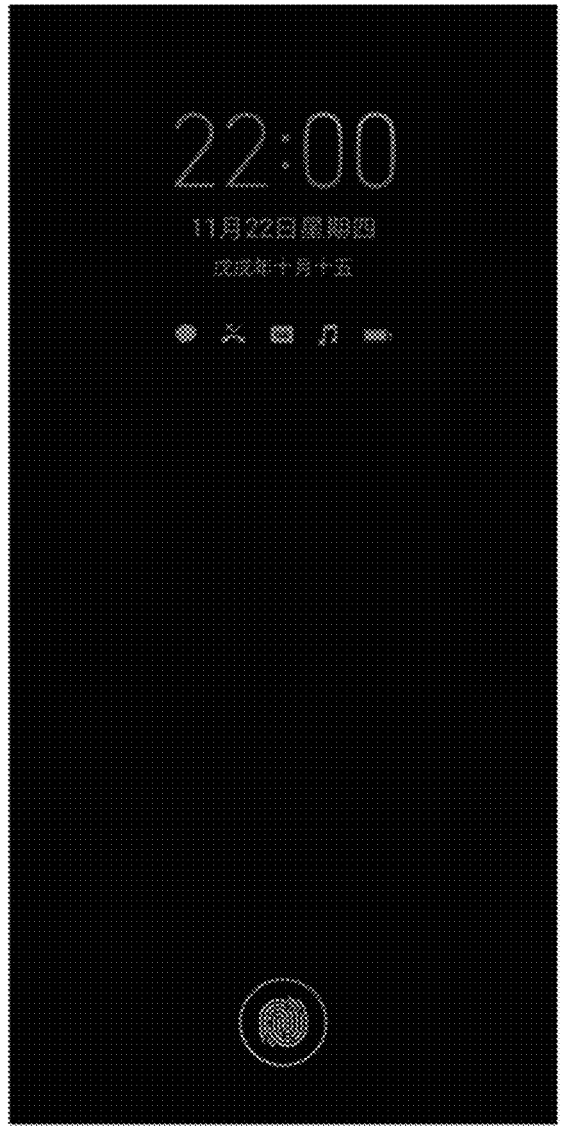
FIG. 15 is another display effect diagram of a target object in an always on display state according to an embodiment of this application.
Figure 15:
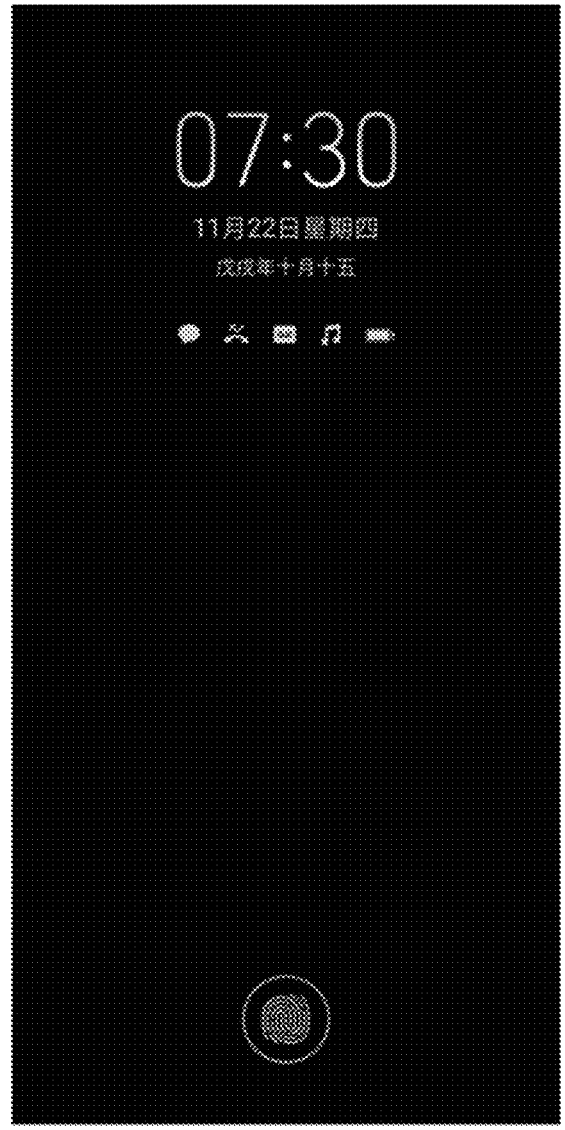
Figure 16:
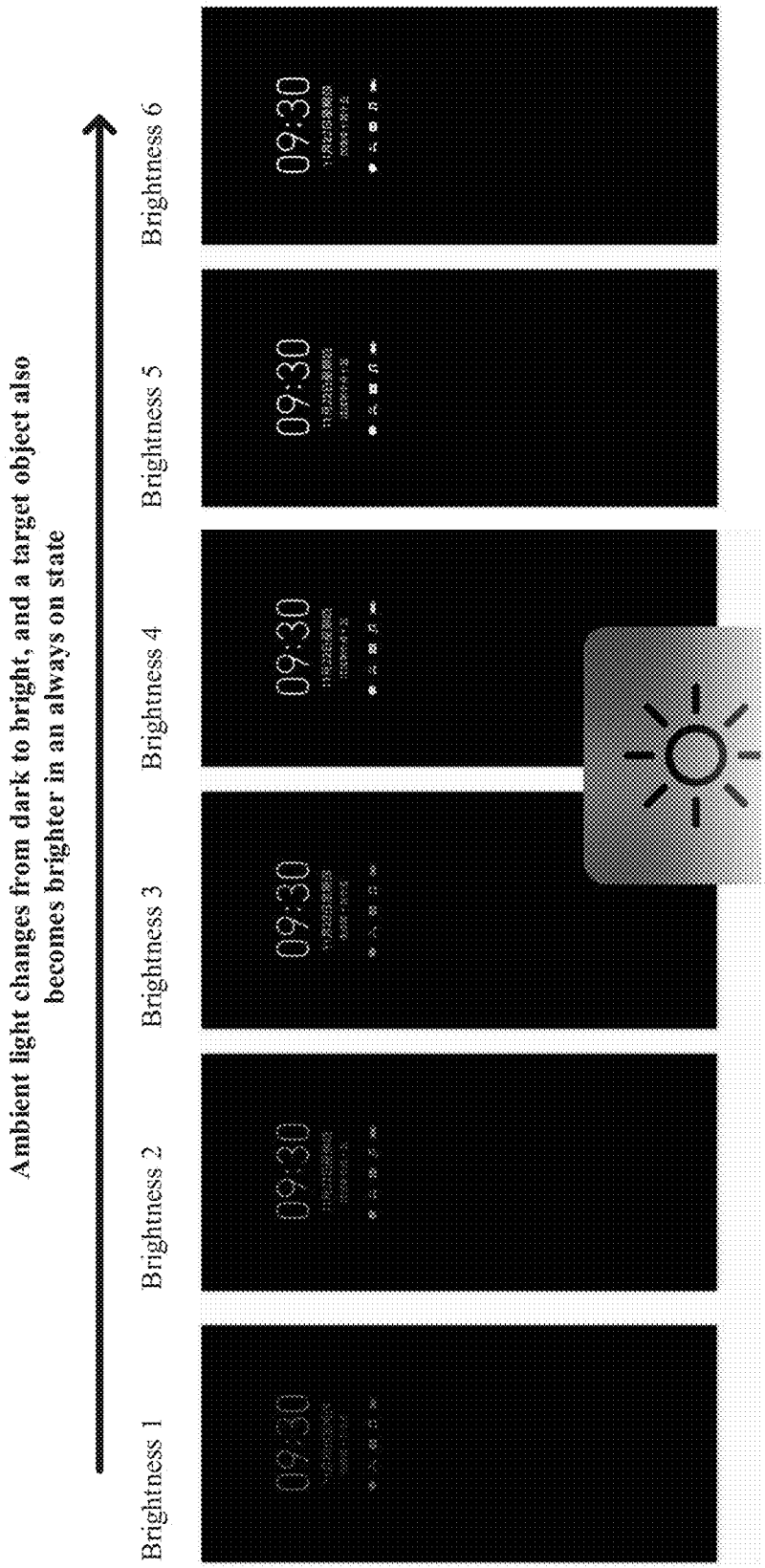
FIG. 16 is another display effect diagram of a target object in an always on display state according to an embodiment of this application.

After determining the display attribute of the target object based on the to-be-displayed information (for example, the target background pattern), the mobile phone may display, on the display in the AOD mode, the target object whose display attribute is determined. For example, when the display attribute includes a color attribute, FIG. 14 is an effect of displaying information on the display by the mobile phone in the AOD mode in the implementation corresponding to FIG. 3. When extreme meteorological information (for example, a polar night and a polar day) occurs on the target area (for example, the Arctic and the Antarctic) of the mobile phone, or the mobile phone cannot obtain information about a sunrise moment and a sunset moment in a current periodicity, as shown in FIG. 15, it is specified that the specified pattern A in FIG. 3 is displayed at night (at sunset or on a polar night), and it is specified that the background pattern 1 in FIG. 3 is displayed when there is no network or on a polar day. When the meteorological information is a weather condition, an implementation is similar, and details are not described herein again. When the display attribute includes brightness, FIG. 16 is an effect of displaying information on the display by the mobile phone in the AOD mode in the implementation corresponding to FIG. 6.

In the embodiments of this application, the terminal device may be divided into functional modules based on the foregoing control method examples. For example, each functional module may be obtained through division based on each function, or two or more functions may be integrated in one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 17:
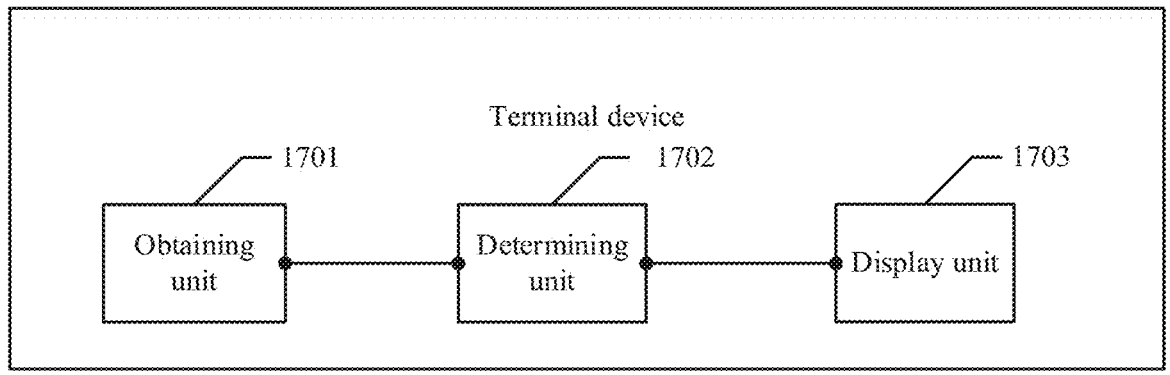
FIG. 17 is a schematic diagram of a terminal device according to an embodiment of this application.

For example, FIG. 17 is a schematic diagram of a terminal device. The terminal device provided in this embodiment of this application may include:

an obtaining unit 1701, configured to obtain meteorological information of a target area in a current periodicity;

a determining unit 1702, configured to determine corresponding to-be-displayed information based on the meteorological information, and determine a display attribute of a target object based on the to-be-displayed information, where the to-be-displayed information is used to reflect the meteorological information, the display attribute of the target object includes a color and/or brightness, and the target object is information displayed on a display by the terminal device in an AOD mode; and a display unit 1703, configured to display, on the display in the AOD mode, the target object whose display attribute is determined.

Preferably, in some implementations of this application, the obtaining unit 1701 may be specifically configured to obtain the meteorological information of the target area in the current periodicity by using a weather application installed in the terminal device or a sensor apparatus built in the terminal device, where the target area includes an area in which the terminal device is currently located or an area set by the terminal device.

In this embodiment of this application, after the obtaining unit 1701 obtains the meteorological information in the current periodicity, the determining unit 1702 associates the meteorological information of the target area in the current periodicity with the display attribute (including the color and/or the brightness) of the target object by using the to-be-displayed information. In addition, the display unit 1703 displays the target object in the AOD mode, so that the displayed information is no longer displayed in a single color all the time, but different display attributes may be presented based on different meteorological information in different periodicities, to present different visual effects.

Figure 18:
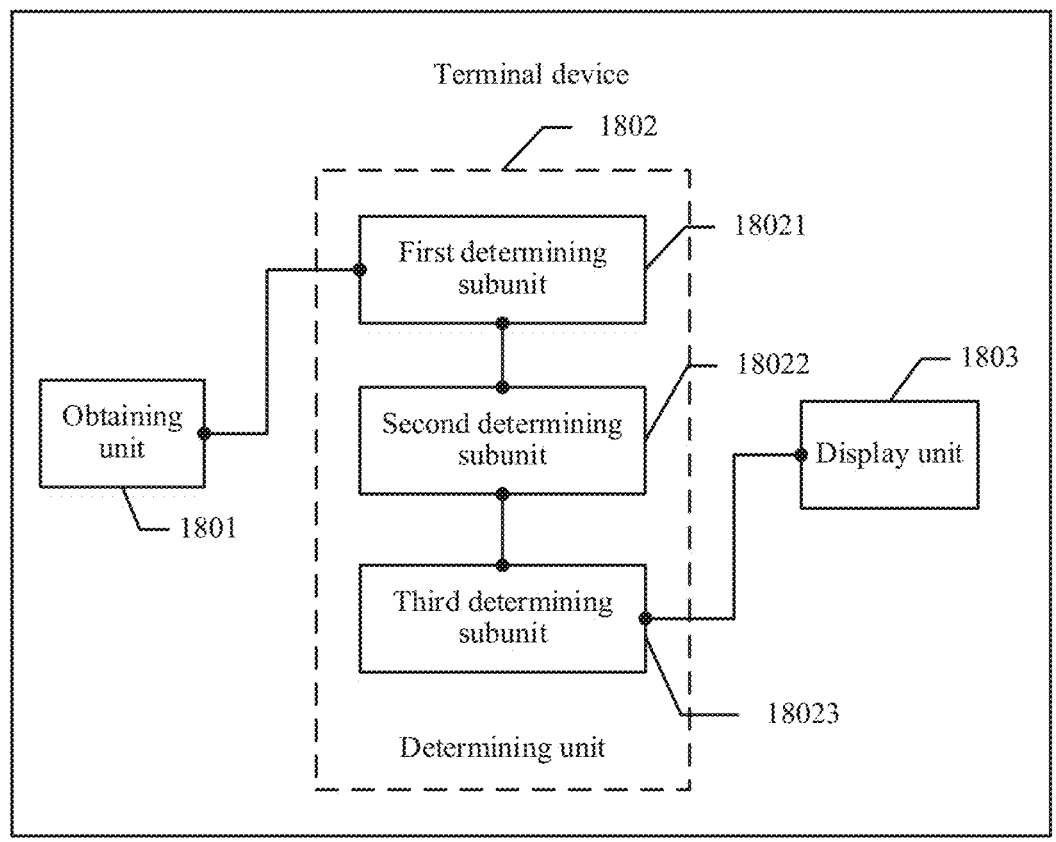
FIG. 18 is another schematic diagram of a terminal device according to an embodiment of this application.

Preferably, in some implementations of this application, the determining unit 1702 may further include more subunits, to implement more functions. FIG. 18 is another schematic diagram of a terminal device according to an embodiment of this application. The terminal device specifically includes an obtaining unit 1801, a determining unit 1802, and a display unit 1803. Functions implemented by the obtaining unit 1801, the determining unit 1802, and the display unit 1803 are similar to those implemented by the obtaining unit 1701, the determining unit 1702, and the display unit 1703 in FIG. 17, and details are not described herein. In this embodiment of this application, the to-be-displayed information includes N background patterns, where N is a positive integer. Accordingly, the determining unit 1802 may further include:

a first determining subunit 18021, configured to determine a corresponding target background pattern based on the meteorological information, where the target background pattern is one of the N background patterns;

a second determining subunit 18022, configured to determine a display attribute of the target background pattern; and a third determining subunit 18023, configured to determine the display attribute of the target object based on the display attribute of the target background pattern.

Preferably, in some implementations of this application, when the meteorological information includes a sunrise moment and a sunset moment, the display attribute of the target object includes a gradient color and/or gradient brightness.

Preferably, in some implementations of this application, when the meteorological information includes a weather condition, the display attribute of the target object includes a single color and/or gradient brightness.

Preferably, in some implementations of this application, when the meteorological information includes a post-sunset moment, a polar night, or a polar day, the display attribute of the target object includes a specified color and/or specified brightness.

Preferably, in some implementations of this application, the specified color may include a specified single color or a specified gradient color.

Preferably, in some implementations of this application, the first determining subunit 18021 may be specifically configured to:

determine duration X between the sunrise moment and the sunset moment, and determine a time interval P between the sunrise moment and the sunset moment;

determine a quantity N of background patterns;

obtain interval duration Y, where Y=X/N;

determine N time intervals Q, where the time interval Q is obtained by evenly dividing the time interval P according to the interval duration Y; and determine, according to a preset rule, a target background pattern corresponding to each time interval Q.

Preferably, in some implementations of this application, the first determining subunit 18021 may be specifically further configured to:

determine, based on a mapping relationship, a target background pattern corresponding to the weather condition. Preferably, in some implementations of this application, the second determining subunit 18022 may be specifically configured to:

obtain ambient light brightness of an environment in which the terminal is located; and determine brightness of the target background pattern based on the ambient light brightness.

Preferably, in some implementations of this application, the N background patterns are obtained by the terminal device from a network in real time in the current periodicity, or the N background patterns are built in the terminal device.

Specific functions and structures of the terminal device in the embodiments corresponding to FIG. 17 and FIG. 18 are used to implement the processing steps performed by the terminal device in FIG. 1 to FIG. 16. Details are not described herein.

Figure 19:
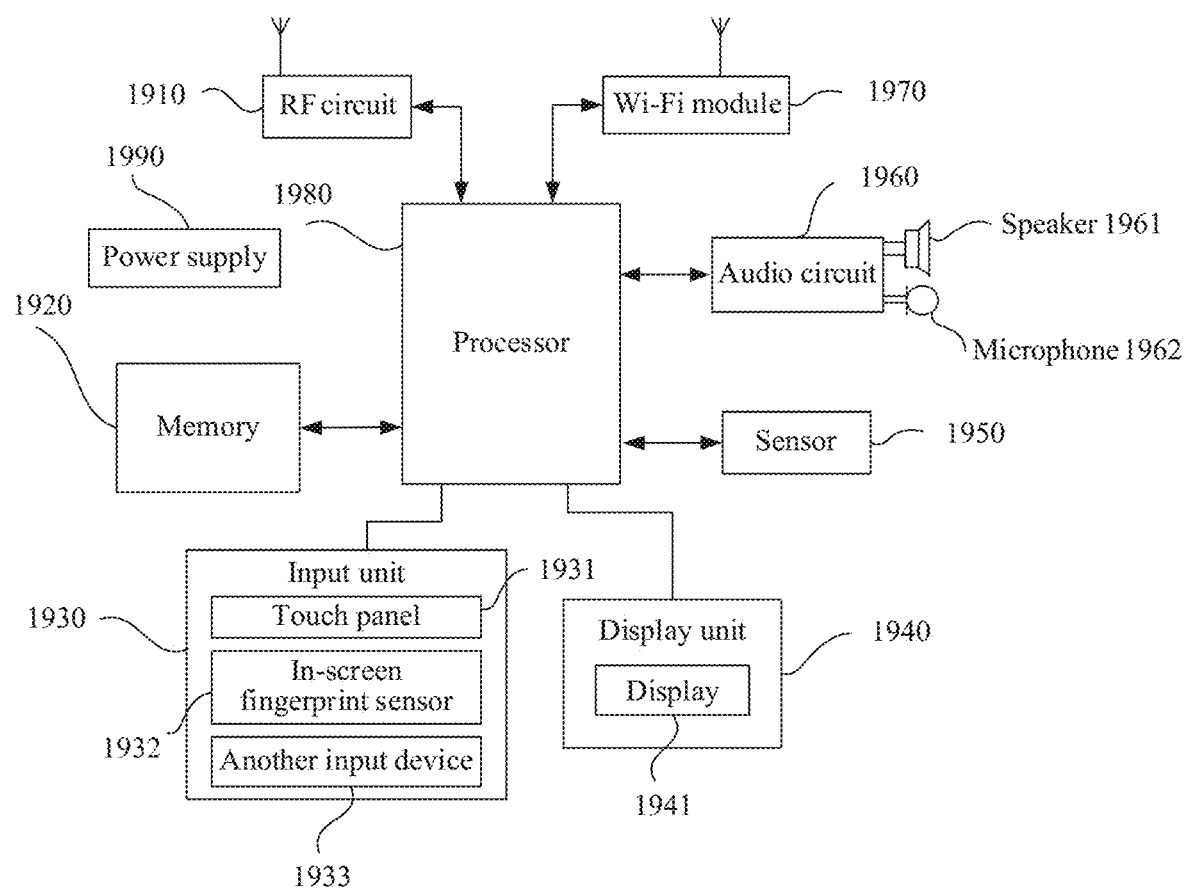
FIG. 19 is another schematic diagram of a terminal device according to an embodiment of this application.

FIG. 19 is another schematic diagram of a terminal device according to an embodiment of this application. For ease of description, only a part related to this embodiment of this application is shown. For technical details that are not disclosed, refer to the methods in the embodiments of this application. The terminal device may be a mobile phone, a tablet computer, a smartwatch, a personal computer, or the like. An example in which the terminal device is a mobile phone is used for description.

The mobile phone includes components such as a radio frequency (radio frequency, RF) circuit 1910, a memory 1920, an input unit 1930, a display unit 1940, a sensor 1950, an audio circuit 1960, a Wi-Fi module 1970, a processor 1980, and a power supply 1990. A person skilled in the art may understand that the structure of the mobile phone shown in FIG. 19 does not constitute a limitation on the mobile phone, and the mobile phone may include more or fewer components than those shown in the figure, or some components may be combined, or a different component deployment may be used.

The following describes the constituent components of the mobile phone in detail with reference to FIG. 19.

The RF circuit 1910 may be configured to receive and send information, or receive and send a signal during a call. In particular, after receiving downlink information of a base station (including a 5G new radio base station), the RF circuit 1910 sends the downlink information to the processor 1980 for processing. In addition, the radio frequency circuit 1910 sends related uplink data to the base station. Usually, the RF circuit 1910 includes but is not limited to an antenna, at least one amplifier, a transceiver, a coupler, a low noise amplifier (low noise amplifier, LNA), a duplexer, and the like. In addition, the RF circuit 1910 may further communicate with a network and another device through wireless communication. Any communications standard or protocol may be used for the wireless communication, and includes but is not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short message service, SMS), and the like.

The memory 1920 may be configured to store a software program and a module. The processor 1980 executes various functional applications of the mobile phone (for example, the weather application in the embodiments of this application) and processes data (for example, obtain a background pattern from a network or obtain a built-in background pattern from the terminal device) by running the software program and the module stored in the memory 1920. The memory 1920 may mainly include a program storage area and a data storage area. The program storage area may store an operating system, an application program required by at least one function (such as a sound play function and an image play function), and the like. The data storage area may store data (such as audio data and a phone book) created based on use of the mobile phone, and the like. In addition, the memory 1920 may include a high speed random access memory, and may further include a nonvolatile memory, for example, at least one magnetic disk storage device, a flash memory, or another volatile solid-state storage device.

The input unit 1930 may be configured to receive entered digital or character information, and generate a key signal input related to user settings and function control of the mobile phone. Specifically, the input unit 1930 may include a touch panel 1931, an in-screen fingerprint sensor 1932, and another input device 1933. The touch panel 1931, also referred to as a touchscreen, may collect a touch operation performed by the user on or near the touch panel 1931 (for example, an operation performed by the user on the touch panel 1931 or near the touch panel 1931 by using any suitable object or accessory such as a finger or a stylus), and may drive a corresponding connection apparatus according to a preset program. Optionally, the touch panel 1931 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, then sends the touch point coordinates to the processor 1980, and receives and executes a command sent by the processor 1980. In addition, the touch panel 1931 may be implemented by using a plurality of types, such as a resistive type, a capacitive type, an infrared type, and a surface acoustic wave type. In addition to the touch panel 1931, the input unit 1930 may further include the another input device 1133. Specifically, the another input device 1133 may include but is not limited to one or more of a physical keyboard, a function button (such as a volume control button or a power button), a trackball, a mouse, a joystick, and the like. It should be noted that, in some bezel-less screen mobile phones, in addition to the touch panel 1931, the input unit 1930 may further include the in-screen fingerprint sensor 1932 (for example, an optical fingerprint sensor or an ultrasonic fingerprint sensor). This is not specifically limited herein.

The display unit 1940 may be configured to display information entered by a user or information provided for a user, and various menus of the mobile phone. The display unit 1940 may include a display 1941 (which may also be referred to as a display panel 1941). Optionally, in this embodiment of this application, the display unit 1940 of the mobile phone is configured in a form of an LCD display, an OLED display, or the like. Further, the touch panel 1931 may cover the display 1941. When detecting the touch operation on or near the touch panel 1931, the touch panel 1931 transmits the touch operation to the processor 1980 to determine a type of a touch event, and then the processor 1980 provides a corresponding visual output on the display 1941 based on the type of the touch event. Although, in FIG. 19, the touch panel 1931 and the display 1941 are used as two independent components to implement input and output functions of the mobile phone, in some embodiments, the touch panel 1931 and the display 1941 may be integrated to implement the input and output functions of the mobile phone.

The mobile phone may further include at least one sensor 1950 such as a light sensor, a motion sensor, and another sensor. Specifically, the light sensor may include an ambient light sensor and a proximity sensor. The ambient light sensor may adjust brightness of the display 1941 based on brightness of ambient light. In the embodiments of this application, when a display attribute of a target background pattern is brightness, the mobile phone may obtain, by using the light sensor, ambient light brightness of an environment in which the mobile phone is located, and further determine the brightness of the target background pattern based on the ambient light brightness. The proximity sensor may turn off the display 1941 and/or backlight when the mobile phone moves to an ear. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein again.

The audio circuit 1960, a speaker 1961, and a microphone 1962 may provide an audio interface between the user and the mobile phone. The audio circuit 1960 may convert received audio data into an electrical signal, and then transmit the electrical signal to the speaker 1961, and the speaker 1961 converts the electrical signal into a sound signal for output. In addition, the microphone 1962 converts a collected sound signal into an electrical signal. The audio circuit 1960 receives the electrical signal, converts the electrical signal into audio data, and then outputs the audio data to the processor 1980 for processing. After the processing, the processor 1980 sends the audio data to, for example, another mobile phone, by using the RF circuit 1910, or outputs the audio data to the memory 1920 for further processing.

Wi-Fi is a short-distance wireless transmission technology. With the Wi-Fi module 1970, the mobile phone may help the user send and receive an email, browse a web page, access streaming media, and the like. The Wi-Fi module 1970 provides wireless access to the broadband internet for the user. Although FIG. 19 shows the Wi-Fi module 1970, it may be understood that the Wi-Fi module 1970 is not a mandatory component of the mobile phone, and may be omitted based on a requirement without changing the essence of the present invention.

The processor 1980 is a control center of the mobile phone, connects various components of the entire mobile phone through various interfaces and lines, and executes various functions and data of the mobile phone by running or executing the software program and/or the module stored in the memory 1920 and invoking data stored in the memory 1920, to perform overall monitoring on the mobile phone. Optionally, the processor 1980 may include one or more processing units. Preferably, an application processor and a modem processor may be integrated into the processor 1980. The application processor mainly processes an operating system, a user interface, an application, and the like. The modem processor mainly processes wireless communication. It may be understood that the foregoing modem processor may not be integrated into the processor 1980.

The mobile phone further includes the power supply 1990 (such as a battery) supplying power to each component. Preferably, the power supply may be logically connected to the processor 1980 by using a power management system, to implement functions such as charging, discharging, and power consumption management by using the power management system.

Although not shown, the mobile phone may further include a camera, a Bluetooth module, and the like. Details are not described herein again.

A structure of the terminal device in the embodiments corresponding to FIG. 1 to FIG. 16 may be based on the structure shown in FIG. 19. The structure shown in FIG. 19 may correspondingly perform the steps in the method embodiments in FIG. 1 to FIG. 16. Details are not described herein again.

All or some of the foregoing embodiments may be implemented by using software, hardware, firmware, or any combination thereof. When software is used to implement the embodiments, all or some of the embodiments may be implemented in the form of a computer program product.

The computer program product includes one or more computer instructions. When the computer program instructions are loaded and executed on a computer, all or some of the procedure or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A method implemented by a terminal device, wherein the method comprises:

obtaining meteorological information of a target area where the terminal device is located, wherein the meteorological information comprises sunrise information and sunset information;
determining, according to the meteorological information, a target background pattern;
setting a color of a digital clock based on a color of the target background pattern reflecting the meteorological information, wherein the digital clock is time information reflecting the time of the terminal device, wherein the color of the digital clock is a gradient color that is the same as the color of the target background pattern; and
displaying, on a display screen of the terminal device when the terminal device is in a screen-off state, the digital clock according to the color of the digital clock.

2. The method of claim 1, further comprising:
storing a plurality of target background patterns comprising the target background pattern corresponding to the meteorological information.

3. The method of claim 1, further comprising:
obtaining ambient light brightness of an environment in which the terminal device is located; and
setting brightness of the digital clock based on the ambient light brightness.

4. The method of claim 1, wherein when the terminal device is in the screen-off state, the method further comprises:
determining a color of a date based on the meteorological information;
determining a color of a notification message based on the meteorological information; and
displaying the date and the notification message on the display screen according to the color of the date and the color of the notification message.

5. The method of claim 1, wherein when the terminal device is in the screen-off state, the method further comprises:
determining a color of a date based on the meteorological information; and
displaying the date on the display screen according to the color of the date.

6. The method of claim 1, wherein when the terminal device is in the screen-off state, the method further comprises:
determining a color of a notification message based on the meteorological information; and
displaying the notification message on the display screen according to the color of the notification message.

7. A terminal device comprising:
a display screen; and
one or more processors coupled to the display screen and configured to:
obtain meteorological information of a target area where the terminal device is located, wherein the meteorological information comprises sunrise information and sunset information;
determine, according to the meteorological information, a target background pattern;
set a color of a digital clock based on a color of the target background pattern reflecting the meteorological information, wherein the digital clock is time information reflecting the time of the terminal device, wherein the color of the digital clock is a gradient color that is the same as the color of the target background pattern; and
display, on the display screen when the terminal device is in a screen-off state, the digital clock according to the color of the digital clock.

8. The terminal device of claim 7, further comprising a memory coupled to the one or more processors and configured to store a plurality of background patterns comprising the target background pattern corresponding to the meteorological information.

9. The terminal device of claim 7, wherein the one or more processors are further configured to:
obtain ambient light brightness of an environment in which the terminal device is located; and
set brightness of the digital clock based on the ambient light brightness.

10. The terminal device of claim 7, wherein when the terminal device is in the screen-off state, the one or more processors are further configured to:
determine, based on the meteorological information, a color for a date and a color for a notification message; and
display the date and the notification message on the display screen according to the color for the date and the color for the notification message.

11. The terminal device of claim 7, wherein when the terminal device is in the screen-off state, the one or more processors are further configured to:
determine a color of a date based on the meteorological information; and
display the date on the display screen according to the color of the date.

12. The terminal device of claim 7, wherein when the terminal device is in the screen-off state, the one or more processors are further configured to:
determine a color of a notification message based on the meteorological information; and
display the notification message on the display screen according to the color of the notification message.

13. The terminal device of claim 9, wherein the brightness of the digital clock comprises a gradient brightness.

14. A computer program product comprising computer-executable instructions that are stored on a non-transitory computer-readable storage medium and that, when executed by one or more processors, cause a terminal device to:
obtain meteorological information of a target area where the terminal device is located, wherein the meteorological information comprises sunrise information and sunset information;
determine, according to the meteorological information, a target background pattern;
set a color of a digital clock based on a color of the target background pattern reflecting the meteorological information, wherein the digital clock is time information reflecting the time of the terminal device, wherein the color of the digital clock is a gradient color that is the same as the color of the target background pattern; and
display, on a display screen of the terminal device when the terminal device is in a screen-off state, the digital clock according to the color of the digital clock.

15. The computer program product of claim 14, wherein the computer-executable instructions, when executed by the one or more processors, further cause the terminal device to store a plurality of target background patterns comprising the target background pattern corresponding to the meteorological information.

16. The computer program product of claim 14, wherein the computer-executable instructions, when executed by the one or more processors, further cause the terminal device to:
obtain ambient light brightness of an environment in which the terminal device is located; and set brightness of the digital clock based on the ambient light brightness.

17. The computer program product of claim 16, wherein the brightness of the digital clock comprises a gradient brightness.

18. The computer program product of claim 14, wherein when the terminal device is in the screen-off state, the computer-executable instructions, when executed by the one or more processors, further cause the terminal device to:
   determine a color of a date based on the meteorological information;
   determine a color of a notification message based on the meteorological information; and
   display the date and the notification message on the display screen according to the color of the date and the color of the notification message.

19. The computer program product of claim 14, wherein when the terminal device is in the screen-off state, the computer-executable instructions, when executed by the one or more processors, further cause the terminal device to:
   determine a color of a date based on the meteorological information; and
   display the date on the display screen according to the color of the date.

20. The computer program product of claim 14, wherein when the terminal device is in the screen-off state, the computer-executable instructions, when executed by the one or more processors, further cause the terminal device to:
   determine a color of a notification message based on the meteorological information; and
   display the notification message on the display screen according to the color of the notification message.

\* \* \* \* \*